(12) United States Patent
Yokotani et al.

(10) Patent No.: US 7,705,584 B2
(45) Date of Patent: Apr. 27, 2010

(54) MAGNETIC SENSOR

(75) Inventors: Masahiro Yokotani, Tokyo (JP); Naoki Hiraoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/484,766

(22) Filed: Jul. 12, 2006

(65) Prior Publication Data

US 2007/0200561 A1 Aug. 30, 2007

(30) Foreign Application Priority Data

Feb. 15, 2006 (JP) ............................. P2006-037609

(51) Int. Cl.
*G01P 3/44* (2006.01)
*G01B 7/30* (2006.01)
*H01L 43/08* (2006.01)

(52) U.S. Cl. ................................. 324/173; 324/207.25

(58) Field of Classification Search ................. 324/165, 324/166, 167, 173, 174, 178, 179, 207.25; 73/514.39
See application file for complete search history.

(56) References Cited

U.S. PATENT DOCUMENTS

| | | | | |
|---|---|---|---|---|
| 4,331,917 A | * | 5/1982 | Render et al. ............... | 324/166 |
| 5,486,759 A | * | 1/1996 | Seiler et al. ............... | 324/207.2 |
| 5,500,585 A | * | 3/1996 | Aab ........................... | 324/165 |
| 6,208,131 B1 | * | 3/2001 | Cebis et al. ................. | 324/165 |
| 6,339,322 B1 | * | 1/2002 | Loreck et al. ............... | 324/166 |
| 6,404,188 B1 | * | 6/2002 | Ricks .................... | 324/207.22 |
| 6,498,474 B1 | * | 12/2002 | Turner ........................ | 324/165 |
| 2002/0030487 A1 | | 3/2002 | Shinjo et al. | |
| 2005/0179429 A1 | * | 8/2005 | Lohberg ................. | 324/207.13 |
| 2007/0182405 A1 | | 8/2007 | Yokotani et al. | |

FOREIGN PATENT DOCUMENTS

| | | |
|---|---|---|
| DE | 19835377 | 2/2000 |
| DE | 10111949 | 4/2002 |
| DE | 102006041614 | 8/2007 |
| JP | 56010257 | 2/1981 |
| JP | 11-051697 A | 2/1999 |
| JP | 2002-90181 A | 3/2002 |

* cited by examiner

*Primary Examiner*—Kenneth J Whittington
(74) *Attorney, Agent, or Firm*—Sughrue Mion, PLLC

(57) ABSTRACT

The magnetic sensor in the invention is arranged to detect a change of magnetic field caused by a movement of the magnetic movable by a magnetic sensor element arranged with a gap to the magnetic movable, to convert the detected change of magnetic field by first and second bridge circuits into electric signals, to generate first and second rectangular-wave signals by first and second comparator circuits depending upon the electric signals, and to form a signal having at least four levels by a signal forming circuit, thereby detecting a moving direction of the magnetic movable depending upon a level-change order in the signal. This makes it possible to detect a rotating direction of the magnetic movable rapidly and correctly.

7 Claims, 15 Drawing Sheets

FIG. 7
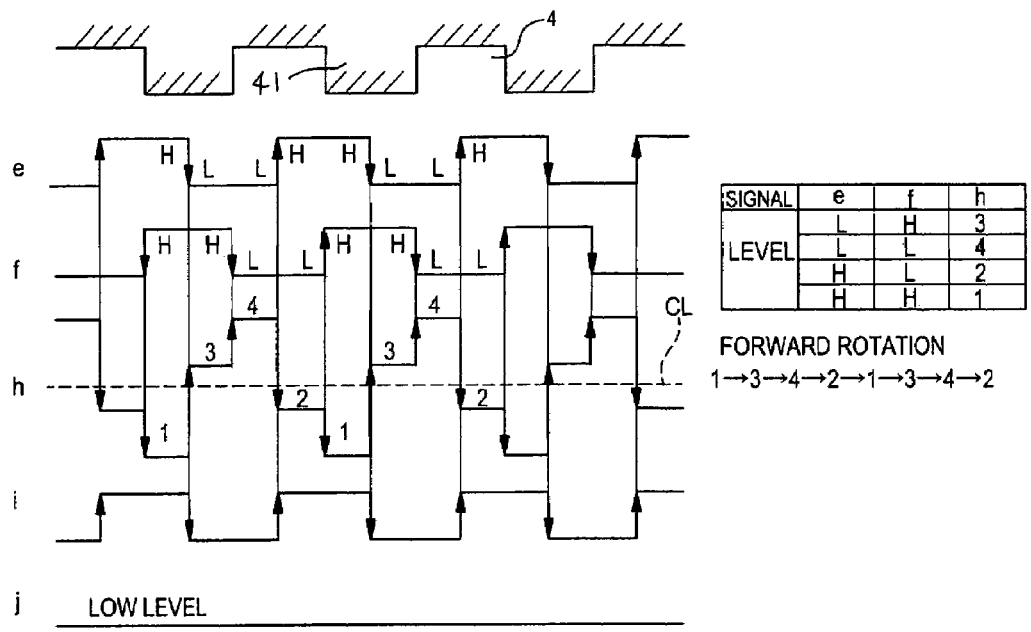
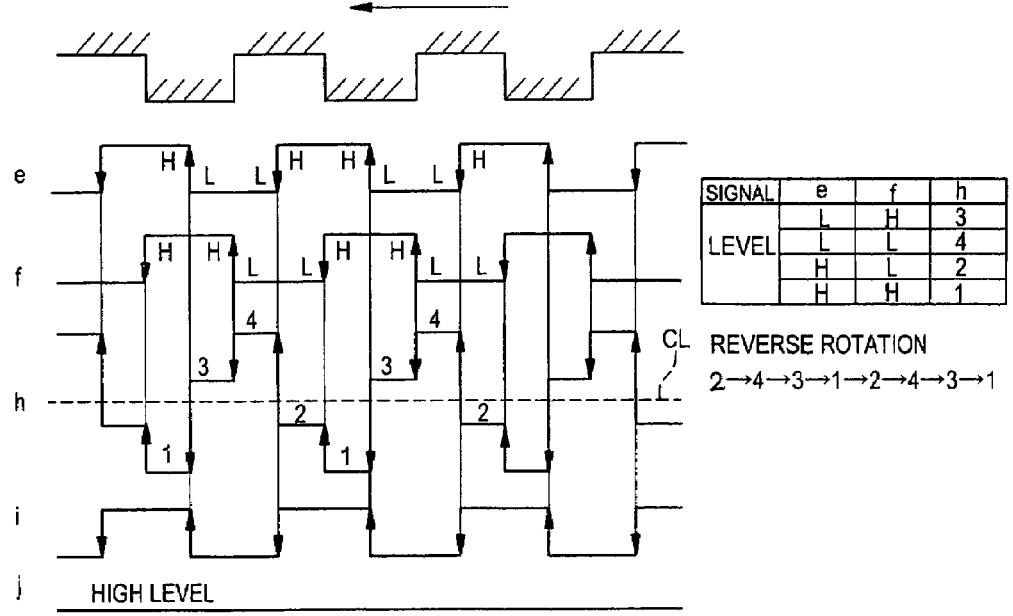

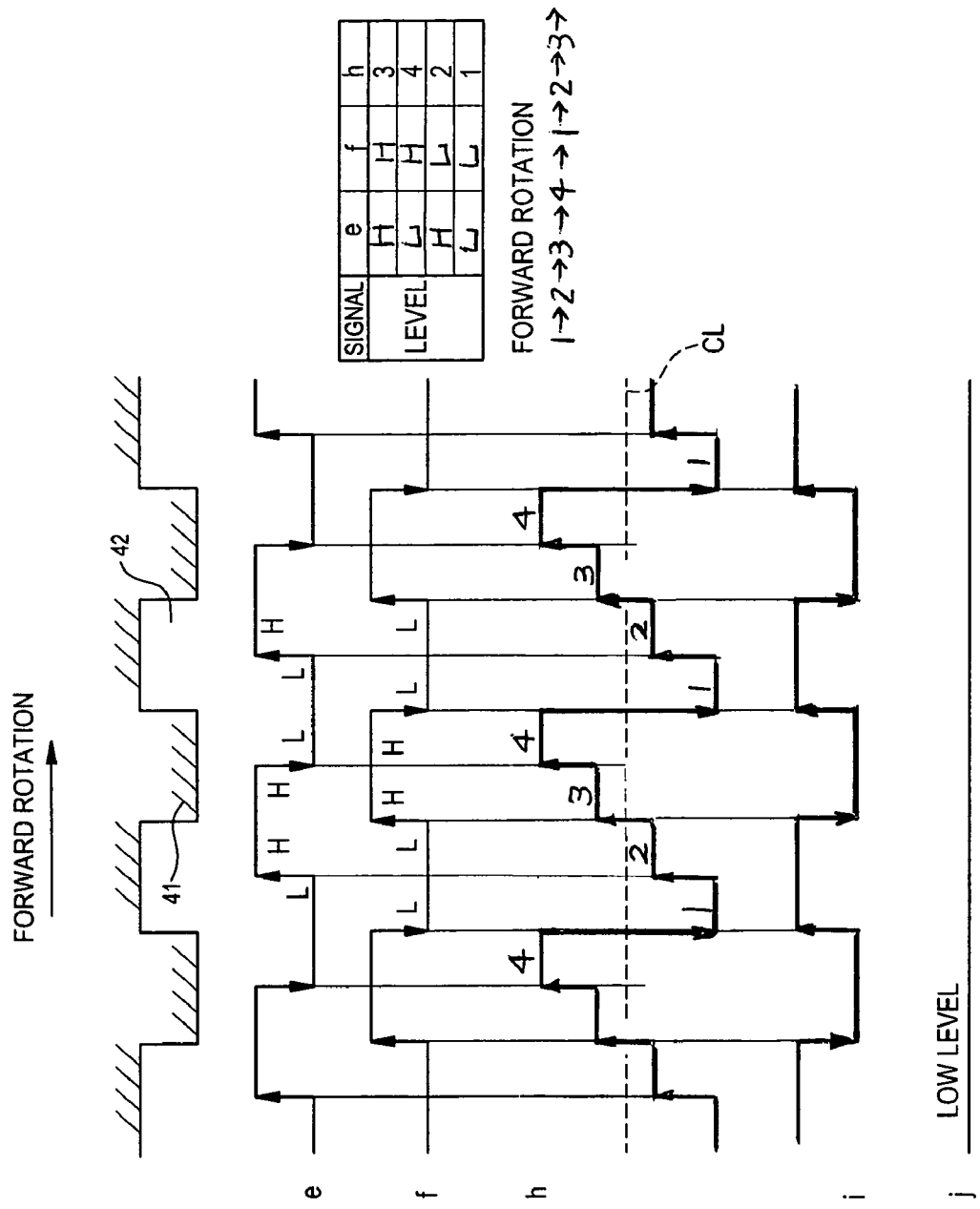

MAGNETIC SENSOR

BACKGROUND OF THE INVENTION

1. Technical Field of the Invention

This invention relates to a magnetic sensor that has a magnetic movable (i.e., magnetic movable member) to move responsive to a movement of an object-being-detected so that a movement of an object-being-detected, particularly a direction of movement thereof, can be detected by using a change of magnetic field due to the movement of the magnetic movable.

2. Description of the Related Art

Conventionally, there is well-known a magnetic sensor adapted to detect a moving direction of an object-being-detected by moving a magnetic movable having convexes in responsive to a movement of the object-being-detected and thereby detecting a change of magnetic field caused by the movement of the magnetic movable through the use of a magneto-resistance element (hereinafter referred to as an MR element).

Such existing magnetic sensors include, say, those having a structure that three MR elements are arranged opposite to a magnetic movable through a slight gap. The MR elements are arranged in a direction of movement of the magnetic movable by inserting those MR elements respectively in two bridge circuits at predetermined sides thereof. The magnetic movable, when moved, causes a resistance change in the MR elements, which is taken as voltage change on two systems from the bridge circuits. From the state of voltage change, detected is a moving direction of the magnetic movable and hence of the object-being-detected. (see JP-A-2002-90181, FIGS. 4-6, description page 6, for example).

In the existing magnetic sensor shown in JP-A-2002-90181, the two-system voltage changes taken out of the bridge circuits are converted by first and second comparator circuits into rectangular-wave signals. One of the rectangular-wave signals is inputted to a base terminal of an output transistor and to a D-terminal of a D-flip-flop circuit. The other rectangular-wave signal is inputted to a CL terminal of the D-flip-flop circuit. The D-flip-flop circuit has an output that is inputted to a base-terminal of another transistor. This transistor has a collector terminal whose voltage is pulled up to the power voltage Vcc, and an emitter terminal connected to an emitter terminal of the output transistor and grounded through a resistance.

The output transistor has an output signal that is delivered to a computer unit and then pulled up to the power voltage Vcc. The output signal of the output transistor is inputted to third and fourth comparator circuits where compared with comparison levels 1 and 2, to obtain two output signals based on the comparison results. In the case one output signal is in a low state in level, a forward movement is to be recognized as to the magnetic movable. When the output signal is a rectangular wave, a reverse movement is to be recognized as to the magnetic movable.

However, in the existing magnetic sensor shown in JP-A-2002-90181, one rise edge of a rectangular-wave signal is used to recognize a moving direction of the magnetic movable. Thus, there problematically encounters a delay in the timing of detecting a moving direction of the magnetic movable.

SUMMARY OF THE INVENTION

It is an object of the present invention to provide a magnetic sensor capable of correctly detecting, free from erroneous detection, a moving direction of a magnetic movable without a significant delay in timing of detecting a moving direction of the magnetic movable.

A magnetic sensor in the invention is a magnetic sensor comprising: a magnetic movable that moves in response to a movement of an object-being-detected; a sensor section provided opposite to the magnetic movable through a gap and for detecting a change of magnetic field in the gap due to a movement of the magnetic movable; a signal forming section that forms a signal having a plurality of levels depending upon the change of magnetic field detected; and a determining section that determines a moving direction of the magnetic movable depending upon a change order of levels in the signal formed by the signal forming section.

According to the magnetic sensor in the invention, there are provided a signal forming section that forms a signal having a plurality of levels depending upon the change of magnetic field detected by the sensor section and a determining section that determines a moving direction of the magnetic movable depending upon a change order of levels in the signal formed by the signal forming section. Accordingly, even when the magnetic movable is inverted in rotation in any timing, a moving direction of the magnetic movable can be detected correctly, without a significant delay, in a manner free from erroneously recognizing a moving direction thereof.

BRIEF DESCRIPTION OF THE DRAWINGS

FIGS. 7A-7B are explanatory figures that explain the operation of the device according to the first embodiment of the invention;

FIG. 16 is an explanatory figure that explains the operation of the device according to the fifth embodiment of the invention.

DESCRIPTION OF THE PREFERRED EMBODIMENTS

Basic Art of the Invention

First of all, description is now made on a magnetic sensor forming the basis of the invention. The magnetic sensor, forming the basis of the invention, uses rise and fall edges of two rectangular-wave signals in detecting a moving direction of a magnetic movable. This can detect a moving direction of the magnetic movable nearly four times faster the existing one in the foregoing. When the MR element and the magnetic movable are in a particular opposite position at a time the magnetic movable is inverted in its moving direction, a reverse rotation of the magnetic movable is detected by the edge next to the first rise or fall edge.

Figure 1:
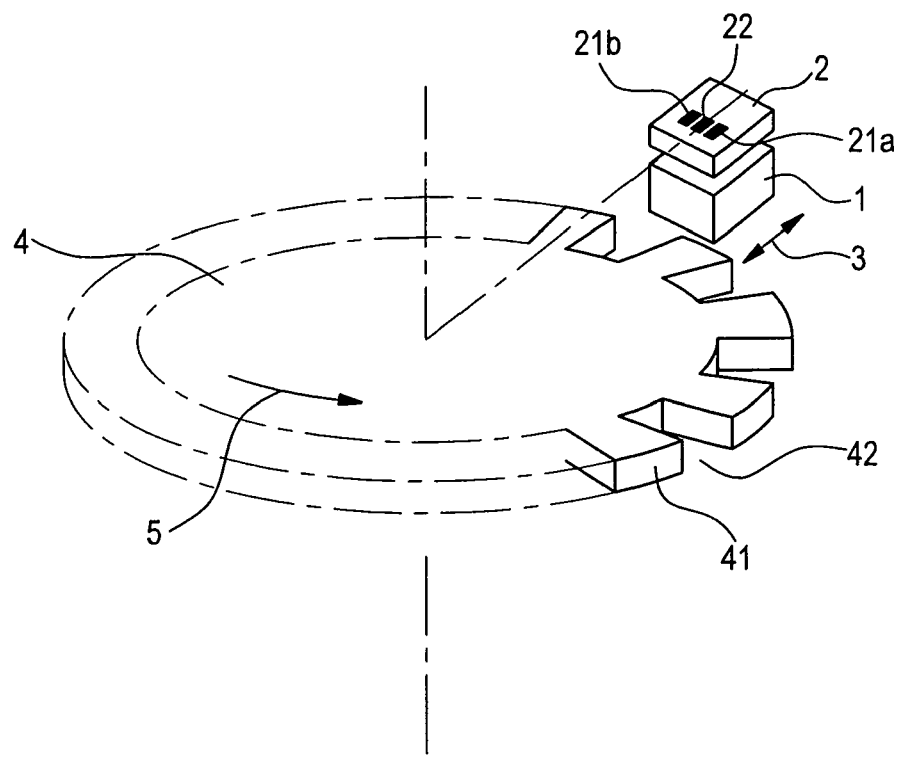
FIG. 1 is a perspective view showing an arrangement of a magnetic movable and MR elements, in an art forming the basis of the present invention.
Figure 2:
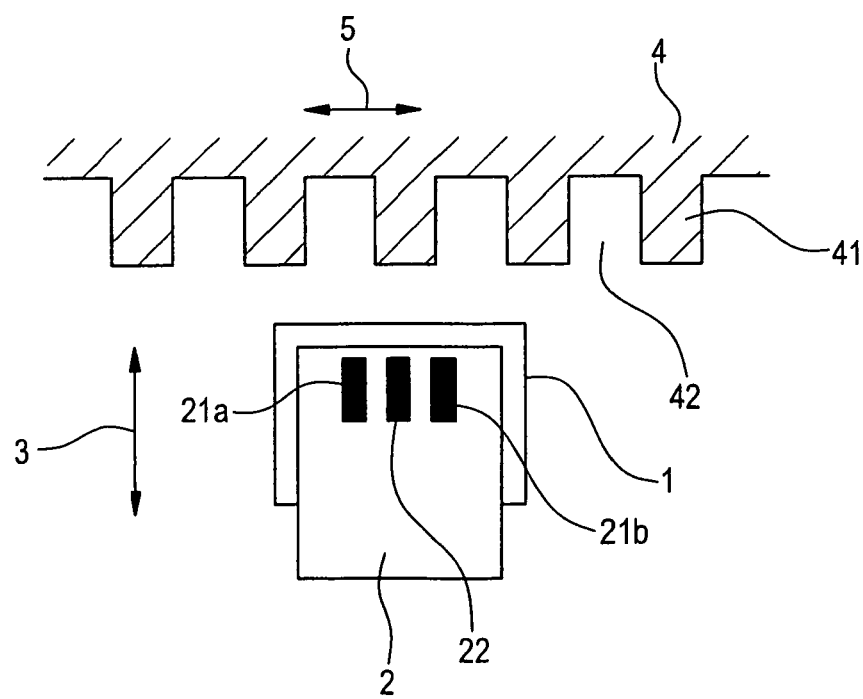
FIG. 2 is an explanatory view showing the arrangement of a magnetic movable and MR elements, in the art forming the basis of the invention.
Figure 3:
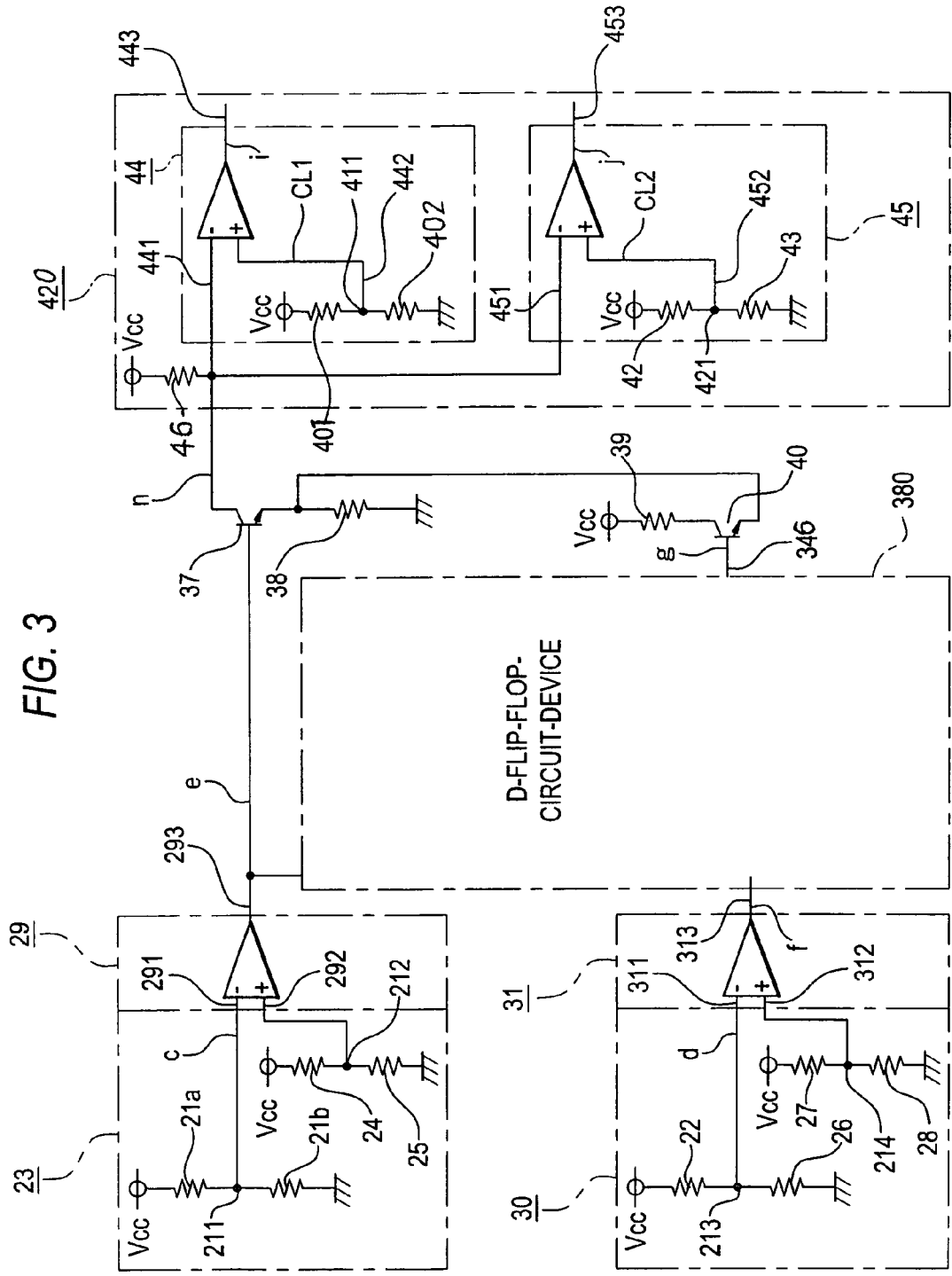
FIG. 3 is a circuit diagram of an art forming the basis of the invention.
Figure 4:
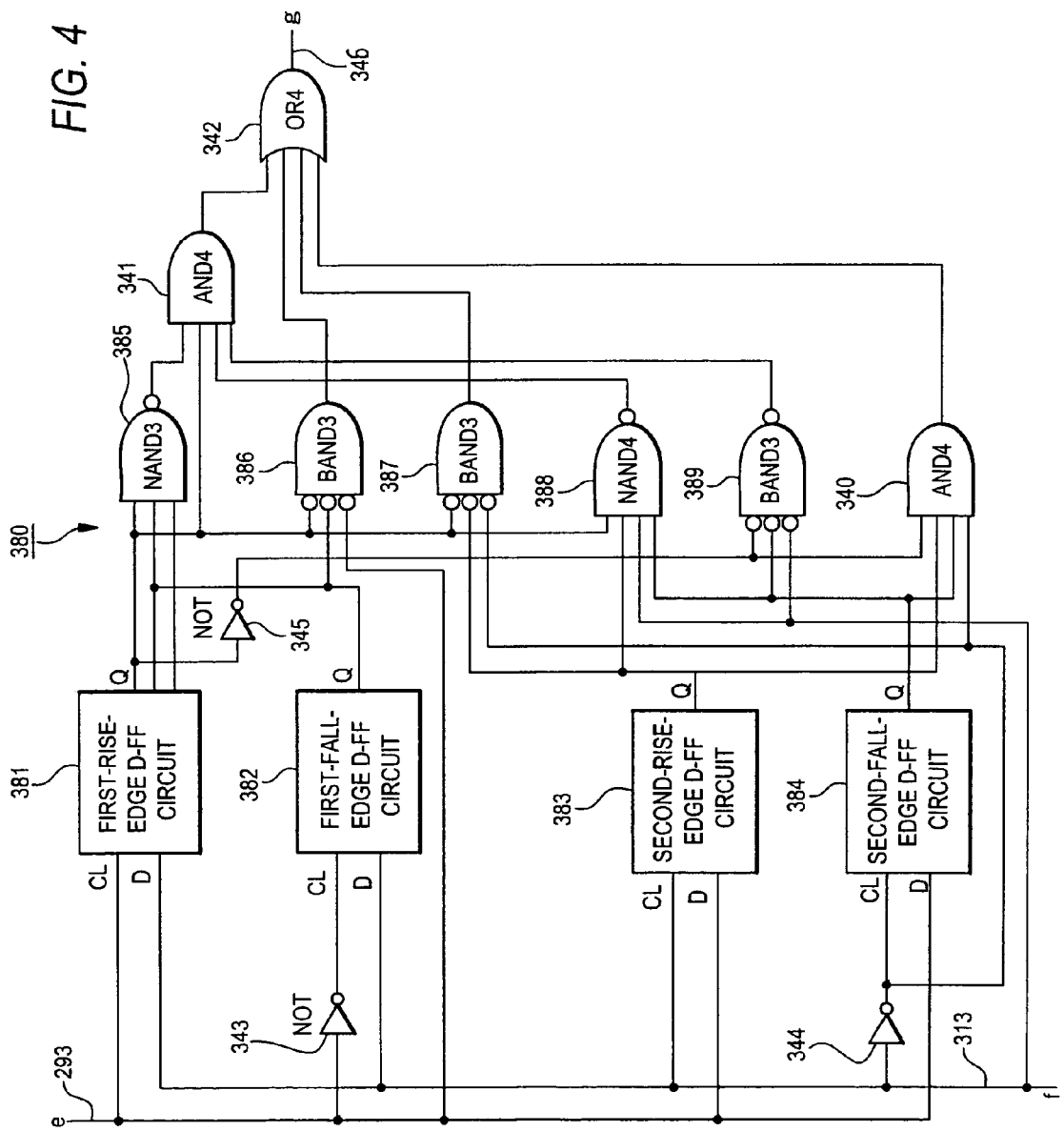
FIG. 4 is a circuit diagram of a D-flip-flop circuit device of the art forming the basis of the invention.

FIG. 1 is a perspective view showing an arrangement of a magnetic movable and MR elements, in an art forming the basis of the invention. FIG. 2 is an explanatory view of the same. FIG. 3 is a circuit diagram of a magnetic sensor. FIG. 4 is a circuit diagram of a D-flip-flop circuit device of the art forming the basis of the invention. FIGS. 5A-5D are explanatory figures that explain the operation of the art forming the basis of the invention.

In FIGS. 1 and 2, on the top surface of a magnet 1 causing a bias magnetic field, there is provided an IC chip 2 integrally structured with MR elements 21a, 21b, 22, or three magnetic detecting elements, constituting a sensor section. The magnet 1 is magnetized in a direction of arrow 3. As for a magnetic movable 4 (i.e., magnetic movable member) having a multiplicity of convexes 41 equally spaced in a periphery thereof, its rotation in a direction of arrow 5 is taken forward while its rotation in a direction reverse thereto is taken reverse. The magnetic movable 4 is arranged to rotate correspondingly to a rotation of an object-being-detected (not shown).

The magnetic movable 4 is arranged such that its peripheral surface is opposed to a side surface of the magnet 1 through a slight gap. Due to the rotation of the magnetic movable 4, the convex 41 and the concave 42 alternately come close to the magnet 1. This causes a change in the magnetic field applied from the magnet 1 to the MR elements 21a, 21b, 22. The change in the magnetic field provides resistance changes in the respective MR elements 21a, 21b, 22, which are to be detected as voltage changes as described later. Incidentally, the MR elements 21a, 21b, 22, of course, may be huge magneto-resistance effect elements (GMR elements).

Referring to FIG. 3, a first bridge circuit 23 is configured by MR elements 21a, 21b and resistances 24, 25. The MR elements 21a, 21b have a connection point 211 connected to an inverted input terminal 291 of a first comparator circuit 29, as a first comparator section. The resistances 24, 25 have a connection point 212 connected as a reference voltage to an non-inverted input terminal 292 of the first comparator circuit 29. It is assumed that the signal to be inputted to the inverted input terminal 291 of the first comparator circuit 29 is "cc" while the signal on an output terminal 293 thereof is "e".

A second bridge circuit 30 is configured by an MR element 22 and resistances 26, 27, 28. The MR element 22 and the resistance 26 have a connection point 213 connected to an inverted input terminal 311 of a second comparator circuit 31 as a second comparator section. The resistances 27, 28 have a connection point 214 connected as a reference voltage to an non-inverted input terminal 312 of the second comparator circuit 31. Meanwhile, in the first and second bridge circuits 23, 30, the MR elements 21a, 22 and the resistances 24, 27 are connected to a power source Vcc while the MR element 21b and the resistances 25, 26, 28 are grounded. It is assumed that the signal to be inputted to the input terminal of the second comparator circuit 31 is "d" while the signal at an output terminal 313 is "f".

A D-flip-flop circuit device (hereinafter referred to as a D-FF circuit device) 380 is configured as shown in FIG. 4. Namely, in FIG. 4, it has a first rise-edge D-flip-flop circuit (hereinafter referred to as a first rise-edge D-FF circuit) 381, a first fall-edge D-flip-flop circuit (hereinafter referred to as a first fall-edge D-FF circuit) 382, a second rise-edge D-flip-flop circuit (hereinafter referred to as a second rise-edge D-FF circuit) 383, and a second fall-edge D-flip-flop circuit (hereinafter referred to as a second fall-edge D-FF circuit) 384.

The first rise-edge D-FF circuit 381 has a CL terminal connected to an output terminal 293 of the first comparator circuit 29, and a D terminal connected to an output terminal 313 of the second comparator circuit 31. The second rise-edge D-FF circuit 383 has a CL terminal connected to an output terminal 313 of the second comparator circuit 31, and a D terminal connected to an output terminal 293 of the first comparator circuit 29. The first fall-edge D-FF circuit 382 has a CL terminal connected to the output terminal 293 of the first comparator circuit 29 through a NOT circuit 343, and a D terminal connected to the output terminal 313 of the second comparator circuit 31. The second fall-edge D-FF circuit 384 has a CL terminal connected to the output terminal 313 of the second comparator circuit 31 through a NOT circuit 344, and a D terminal connected to the output terminal 293 of the first comparator circuit 29.

The first and second rise-edge D-FF circuits 381, 382 are well-known D-flip-flop circuits. When the input signal to the CL terminal is low in level, the output terminal Q maintains the current output state regardless of the level of a signal inputted to the D terminal. When a high-level signal is inputted to the CL terminal, triggering is effected by its rise edge. When the signal to the D terminal is high in level, the output terminal Q has a high-level signal while, when the signal to the D terminal is low in level, the output terminal Q has a low-level signal.

The first and second fall-edge D-FF circuits 382, 384 are well-known D-flip-flop circuits. When the input signal to the NOT circuit 343, 344 connected to the CL terminal is high in level, i.e. when the input signal to the CL terminal is low in level, the output terminal Q maintains the current output state regardless of the level of a signal inputted to the D terminal. When a low-level signal is inputted to an input terminal of the NOT circuit 343, 344 connected to the CL terminal, triggering is effected by its fall edge, i.e. by the rise edge of a high-level signal inputted to the CL terminal. When the signal to the D terminal is high in level, the output terminal Q has a high-level signal while, when the signal to the D terminal is low in level, the output terminal Q has a low-level signal.

The respective Q terminals, of the first and second rise-edge and fall-edge D-FF circuits 381, 382, 383, 384, are connected to a 4-terminal OR circuit 342 through a logic circuit formed by a 3-input NAND circuit 385, 3-input BAND circuits 386, 387, a 4-input NAND circuits 388, a 4-input BNAND circuit 389 and 4-input AND circuits 340, 341, as shown in the figure. The 4-terminal OR circuit 342 has an output terminal 346 connected to a base of a second transistor (hereinafter referred to as a second Tr) 40 shown in FIG. 3. It is assumed that the 4-terminal OR circuit 342 has a signal "g" at its output terminal 346.

Referring back to FIG. 3, a first, or output, transistor (hereinafter referred to as a first Tr) 37 has a base connected to the output terminal 293 of the first comparator circuit 29, and an emitter grounded through a resistance 38. The second Tr 40 has a base connected to an output terminal 346 of the 4-terminal OR circuit 342 shown in FIG. 4, an emitter connected to a connection point of the emitter of the first Tr 37 and the resistance 38, and a collector connected to a power source Vcc through a resistance 39.

A computer unit 420 has third and fourth comparator circuits 44, 45 whose inverted input terminals 441, 451 are both connected to the power source Vcc through a resistance 46. The third comparator circuit 44 has a non-inverted input terminal 442 connected to a connection point 411 of the resistances 401, 402 while the fourth comparator circuit 45 has a non-inverted input terminal 452 connected to a connection point 421 of the resistances 403, 404. The resistances 401, 403 are connected to the power source Vcc while the resistances 402, 404 are grounded. It is assumed that the signal inputted to the inverted input terminal 441, 451 of the third and fourth comparator circuit 44, 45 is "h", the signal on the output terminal 443 of the third comparator circuit 44 is "i", and the signal on the output terminal 453 of the fourth comparator circuit 45 is "j".

Figure 5:
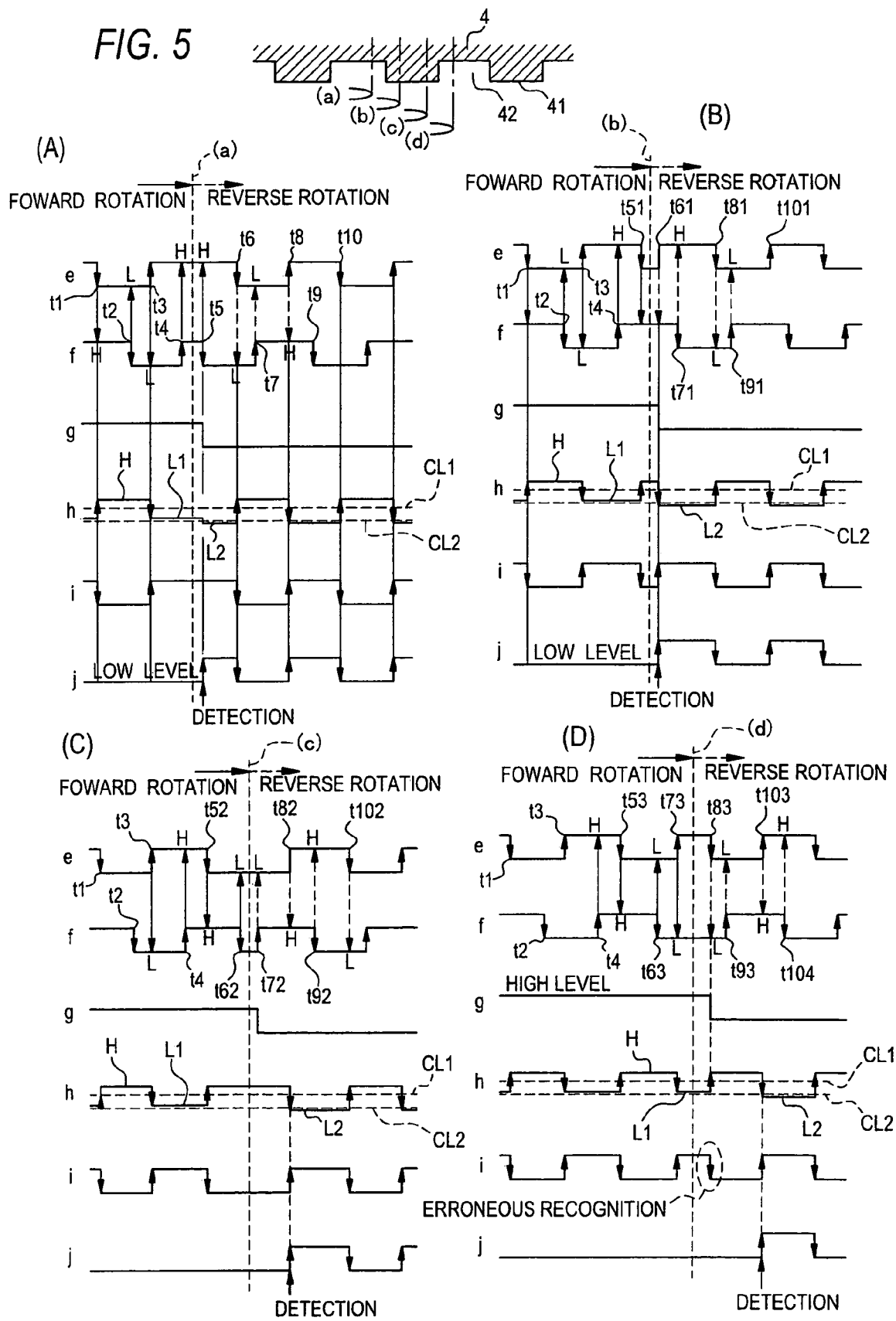
FIGS. 5A-5D are explanatory figures that explain the operation of the art forming the basis of the invention.

The operation is now described. FIG. 5A shows the waveforms of signals e, f, g, h, i, j on the respective terminals of the circuit shown in FIGS. 3 and 4 in the case rotation is switched from forward to reverse when the magnetic movable 4 and the MR element 22 in the center of the magnet 1 (see FIG. 1) are relatively opposite in a position (a). Likewise, FIGS. 5B, 5C and 5D show the waveforms of the signals e, f, g, h, i, j in the case rotation is switched from forward to reverse when the magnetic movable 4 and the center MR element 22 of the magnet 1 are relatively opposite in a position (b), (c) or (d). The signal h is given a binary-signal pulse having high and low levels H, L1 at a forward rotation of the magnetic movable 4, and a binary-signal pulse having high and low levels H, L2 at a reverse rotation of the magnetic movable 4.

Referring to FIG. 5A, when the magnetic movable 4 rotates forward, the magnetic movable 4 at its convex 41 and concave 42 alternately becomes opposite to the MR element 21a, 22 and 21b differently in time in the order. This provides a change in the bias magnetic field to each of the MR elements 21a, 22, 21b and hence a change in the resistance thereof.

The resistance change of the MR element 21a, 22, 21b causes a change in the signal c, d, to be inputted to the inverted input terminal 291, 311 of the first and second comparator circuit 29, 31, into a sinusoidal waveform. When the magnetic movable 4 rotates forward, the signal c is advanced a predetermined amount of phase relative to the signal d due to a positional relationship in arrangement of the MR elements 21a, 22, 21b.

In FIG. 5A, if it is now assumed that the signal e at time t1 changes from the high to low level, the first fall-edge D-FF circuit 382 is triggered. Because the signal f, inputted to its D terminal from the second comparator circuit 29, is high in level, its Q terminal has a signal high in level. Thus, the 4-terminal OR circuit 342 at its output terminal 346 has a signal g high in level.

This places the second Tr 40 in conduction and the first Tr 37 in non-conduction. As a result, the first Tr 37 has a collector signal h high in level. The third comparator circuit 44 has a comparison level CL1 given between the high and low levels H, L1 of the signal h while the fourth comparator circuit 45 has a comparison level CL2 given between the low and low levels L1, L2 of the signal h. Accordingly, at the time t1, the third comparator circuit 44 has an output signal i low in level while the fourth comparator circuit 45 has an output signal j staying low in level.

At time t2, the signal f, on the output terminal 313 of the second comparator circuit 31, falls from the high to low level, to cause a triggering in the second fall-edge D-FF circuit 384. The signal e, on the output terminal 293 of the first comparator circuit 29, is low in level at the time t2 so that the Q terminal has a signal low in level. However, the Q terminal of the first fall-edge D-FF circuit 382 maintains the high level, and the 4-terminal OR circuit 342 has an output g high in level. Accordingly, the third and fourth comparator circuits 44, 45 have output signals i, j staying low in level.

At time t3, the signal e of from the first comparator circuit 29 rises to cause a triggering in the first rise-edge D-FF circuit 381. However, because the signal f, on the output terminal 313 of the second comparator circuit 31, is low in level, the Q terminal has a signal low in level. At the time t3, the first fall-edge D-FF circuit 382 has, at its Q terminal, a signal maintained high in level, and the 4-terminal OR circuit 342 has, at its output terminal 346, a signal g high in level. For this reason, the second Tr 40 stays conductive. Meanwhile, the first Tr 37 becomes conductive because the signal e becomes high in level. Through the resistance 38, there is caused an additional flow of a current supplied from the second Tr 40, which makes the signal h low in level L1.

By turning the signal h to a low level L1, the third comparator circuit 44 whose comparison level is set at the first comparison level CL1 has an output signal i high in level. Because the fourth comparison circuit 45 has a comparison level given at the second comparison level CL2, its output signal j stays low in level.

At time t4, when the signal f on the output terminal 313 of the second comparator circuit 31 rises to a high level, the second rise-edge D-FF circuit 383 is triggered. Because the signal on the D terminal is high in level, a high-level signal is outputted from the Q terminal. Due to this, the 4-terminal OR circuit 342 has an output signal g maintained high in level, and the second Tr 40 continues conductive. For this reason, the signal h stays low in level L1. Thus, at the time t4, there is no change in the output signals i, j of the third and fourth comparator circuits 44, 45 from those at the time t3.

In this manner, when the magnetic movable 4 rotates forward, the third comparator circuit 44 has an output signal i assuming a binary-signal pulse having high and low levels whereas the fourth comparator circuit 45 has an output signal j staying low in level. Namely, by the fact that the output signal i appears as a binary signal having high and low levels while the output signal j continues low in level, it can be determined that the magnetic movable 4 is in a forward rotation.

It is now assumed that, when the magnetic movable 4 and the MR element 22 provided in the magnet 2 are in a positional relationship (a), in case the magnetic movable 4 changes from the forward to reverse rotation, the signal f on the output terminal 313 of the second comparator circuit 31 changes into a low level at time t5 that the MR element 21b first becomes opposite to the convex 41 of the magnetic movable 4. Due to this, the signal g on the output terminal 346 of the 4-terminal OR circuit 342 changes into a low level. The second Tr 40 becomes non-conductive and the signal h turns into a low level L2. This changes, to a high level, the signal j on the output terminal 453 of the fourth comparator circuit 45.

When the magnetic movable 4 rotates reverse, the magnetic movable 4 at its convex 41 and concave 42 alternately becomes opposite to the MR element 21b, 22 and 21a differently in time in the order conversely to the forward rotation.

At time points t6, t8 and t10 after the time point t5, the signal j on the output terminal 453 of the fourth comparator circuit 45 becomes changing alternately between low and high levels synchronously with the signal i on the output terminal 443 of the third comparator circuit 44. Accordingly, by the fact that the output signal j changes alternately between low and high levels, it can be determined that the magnetic movable 4 is in a reverse rotation.

Namely, where rotation is reversed in the positional relationship (a) in FIG. 5A, the signal h changes into an L2 level at time t5 the signal f first changes and the signal j changes from the low to high level. Accordingly, reverse rotation is to be immediately detected at time t5 that the signal f first changes. Likewise, where rotation is reversed in the positional relationship (b), the signal h becomes L2 at time t61 the signal e first changes, as shown in FIG. 5B. At the time t61, reverse rotation is immediately detected. Where rotation is reversed in the positional relationship (c), the signal h becomes L2 at time t82 that the signal e first changes, as shown in FIG. 5C. At the time t82, a reverse rotation can be detected.

Nevertheless, where the magnetic movable 4 in a positional relationship (d) rotates reverse, the signal h does not change in level to L2 at any of time points t83, t93 that the signal e, f first changes after a reverse rotation, as shown in FIG. 5D. For this reason, detection is possibly erroneous at time t83 that reverse rotation can be detected in the normal case, thus making impossible to detect a reverse rotation. It is impossible to detect a reverse rotation before the time point t1 the signal h changes in level to L2.

First Embodiment

Figure 6:
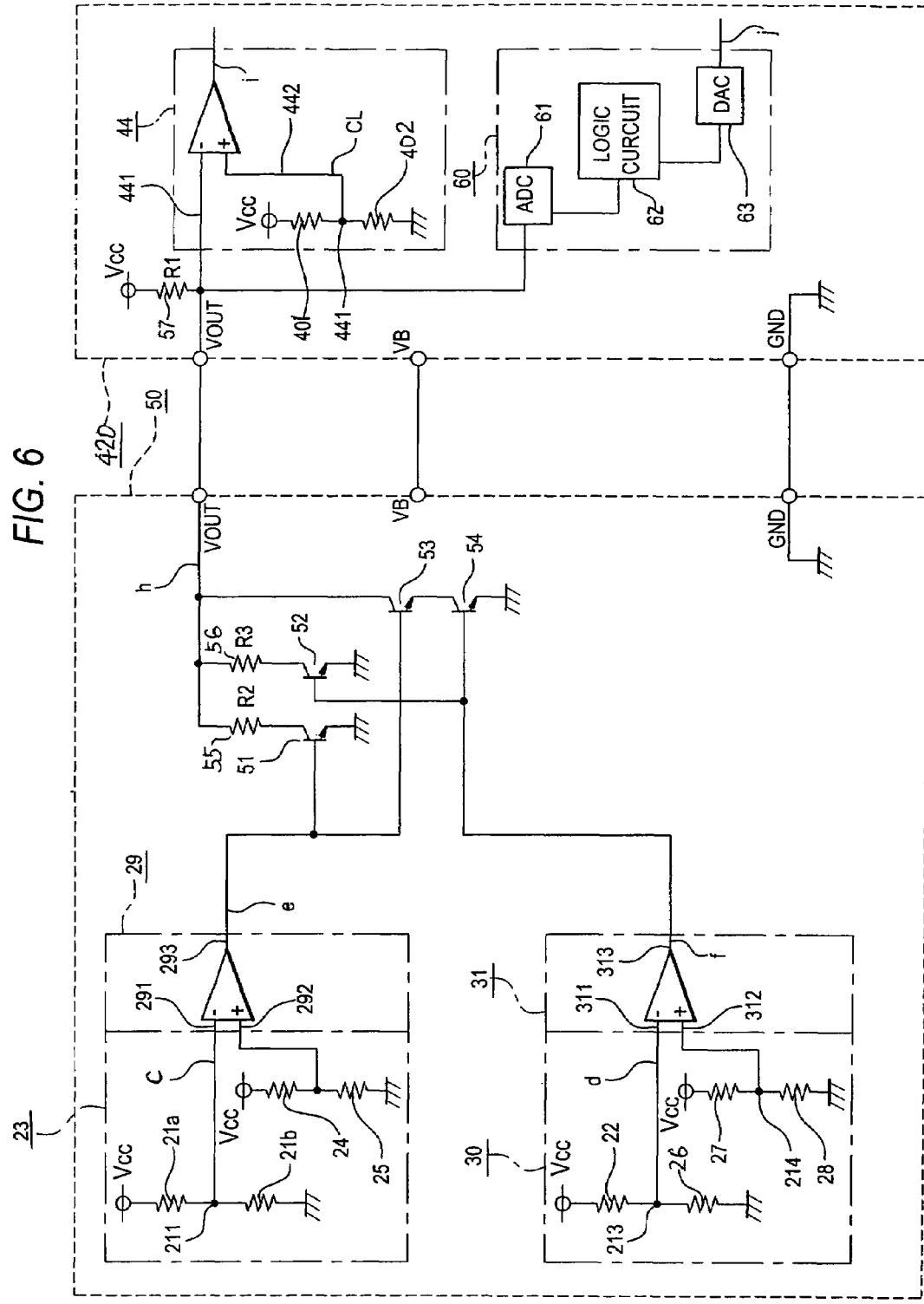
FIG. 6 is a circuit diagram of a device according to a first embodiment of the invention.

FIG. 6 shows a circuit diagram of a magnetic sensor according to a first embodiment of the invention. FIGS. 7A-7B are explanatory figures that explain the operation of the same. Like or corresponding elements to those in the foregoing art forming the basis of the invention are attached with the like numerals. In FIG. 6, a first, or output, transistor (hereinafter referred to as a first Tr) 51 has a base connected to an output terminal 293 of a first comparator circuit 29, and a collector connected to an output terminal OUT of a sensor unit 50 through a resistance 55, and an emitter grounded. The output terminal VOUT of the sensor unit 50 is connected to an inverted input terminal 441 of a third comparator circuit 44 of a computer unit 420.

A second, or output, transistor (hereinafter referred to as a second Tr) 52 has a base connected to an output terminal 313 of a second comparator circuit 31, a collector connected to an output terminal VOUT through a resistance 56, and an emitter grounded. A third, or output, transistor (hereinafter referred to as a third Tr) 53 has a base connected to the output terminal 293 of the first comparator circuit 29, a collector connected to the output terminal VOUT. A fourth, or output, transistor (hereinafter referred to as a fourth Tr) 54 has a base connected to the output terminal 313 of the second comparator circuit 31, a collector connected to the the emitter of the third Tr 53, and an emitter grounded.

The sensor unit 50 is supplied with power from a computer unit 420 through a power terminal VB while its ground terminal GND is grounded. Note that resistances 55, 56, 57 are assumed to have respective values R2, R3, R1.

Due to the rotation of the magnetic movable, resistance change takes place in the MR elements 21a, 21b, 22. By first and second bridge circuits 23, 30, two-system voltage changes are obtained as signals c, d. The signals c, d are respectively converted by the first and second comparator circuits 29, 31 into rectangular waves, thus obtaining signals e, f. One signal, or rectangular wave, e is inputted to the bases of the first and third Trs 51, 53. The other signal, or rectangular wave, f is inputted to the bases of the second and fourth Trs 52, 54.

The signal h, outputted from the sensor unit 50, is delivered to the computer unit 420 and then pulled up to the power voltage Vcc. The signal h is inputted to the inverted input terminal of the third comparator circuit 44 where it is compared with a comparison level CL inputted to the non-inverted input terminal 442, thus obtaining a signal i. Meanwhile, the signal h is inputted to an analog-to-digital converter (hereinafter referred to as an ADC) 61 of a reverse-rotation detecting circuit 60 where it is converted into a digital signal. The digital signal is passed through a logic circuit 62 and then re-converted by a digital-to-analog converter (hereinafter referred to as a DAC) 63 into an analog form, thus obtaining a reverse-rotation detection signal j.

In the first embodiment of the invention, the MR elements 21a, 21b, 22 constitute a sensor section in the invention. The first and second bridge circuits 23, 30, the first and second comparator circuits 29, 31 and the first to fourth Trs 51, 52, 53, 54 constitute a signal forming section in the invention. The third comparator circuit 44 and the reverse-rotation detecting circuit 60 constitute a determining section in the invention. Furthermore, the first and second bridge circuits 23, 30 and the first and second comparator circuits 29, 31 constitute a converting circuit in the invention. The first to fourth Trs 51, 52, 53, 54 constitute a signal forming circuit in the invention.

FIG. 7A is an explanatory figure showing the waveforms of the signals e, f, h, i, j in a forward rotation of the magnetic movable while FIG. 7B is an explanatory figure showing the waveforms of the signals e, f, h, i, j in a reverse rotation thereof.

Referring to FIGS. 6 and 7, the operation is now described as to the magnetic sensor in the first embodiment of the invention.

Referring to FIG. 7A, signals e, f respectively occur as rectangular waves, as shown in the figure, on the output terminals 293, 313 of the first and second comparator circuits 29, 31. Due to forward rotation of the magnetic movable 4, the MR elements 21a, 22, 21b become opposite, in the order, to the convex 41 of the magnetic movable 4. Hence, the signal e is advanced a predetermined amount of phase relative to the signal f. In one period the MR element is opposed to the convex 41 and concave 42 of the magnetic movable 4, there occur four patterns of combinations of high and low levels H, L of the signals e, f. The different combinations of those provide four patterns of signal-h levels "1", "2", "3", "4" different one from another. For this reason, the convex 41 and concave 42 of the magnetic movable 4 can be detected with a quarter period depending upon the level difference in the signal h.

More specifically, the level change in the signal h is described in detail in the following.

(1) With Signals e, f Both High in Level H

The first to fourth Trs 51, 52, 53, 54 are all conductive, so that the signal h takes the level of grounding GND. In FIG. 7A, the signal-h level in this case is shown at "1".

(2) With Signal e High in Level H and Signal f Low in Level L

The first and third Trs 51, 53 are conductive whereas the second and fourth Trs 52, 54 are non-conductive. This provides:

$$\text{signal } h = VCC \times \{R2/(R1+R2)\}.$$

In FIG. 7A, the signal-h level in this case is shown at "2".

(3) With Signal e Low in Level L and Signal f High in Level H

The first and third Trs 51, 53 are non-conductive whereas the second and fourth Trs 52, 54 are conductive. This provides:

signal $h=VCC\times\{R3/(R1+R3)\}$.

In FIG. 7A, the signal-h level in this case is shown at "3".

(4) With Signals e, f Both Low in level L

The first to fourth Trs 51, 52, 53, 54 are all non-conductive, so that the signal h takes the level of power voltage VCC. In FIG. 7A, the signal-h level in this case is shown at "4".

If it is now assumed that VCC=3 [V], R1=2 [KΩ], R2=1 [KΩ] and each Tr's Vsat=0, then the following results:

level "1" of the signal h=0 [V]
level "2" of the signal h=1 [V]
level "3" of the signal h=2 [V]
level "4" of the signal h=3 [V].

The third comparator circuit 44 has a comparison level CL set at between the signal-h levels "2" and "3". For a signal h having levels "3" and "4", the third comparator circuit 44 has an output signal i that is low in level. For a signal h having levels "1" and "2", the signal i is high in level. Meanwhile, in the reverse-rotation detecting circuit 60, when the input signal h changes in level as "1", "3", "4" and "2" in this order, the logic circuit 62 makes a processing such that the output signal j is maintained low in level. Accordingly, by the fact the signal j becomes low in level, a forward rotation can be detected as to the magnetic movable 4 and hence the object-being-detected.

Referring to FIG. 7B, due to reverse rotation of the magnetic movable 4, the MR elements 21b, 22, 21a become opposite, in the order, to the convex 41 of the magnetic movable 4 in a manner conversely to that of forward rotation. Hence, signals e occur respectively on the output terminals 293, 313 of the first and second comparator circuits 29, 31, with a significant delay in a predetermined amount of phase relative to the signal f. In one period the MR element is opposed to the convex 41 and concave 42 of the magnetic movable 4, there occur four patterns of combinations of high and low levels H, L of the signals e, f. The different combinations of those provide a signal h with four patterns of levels "1", "2", "3", "4" different one from another. For this reason, the convex 41 and concave 42 of the magnetic movable 4 can be detected with a quarter period depending upon the level difference in the signal h.

The level change in the signal h is similar to that in a forward rotation.

(1) For signals e, f both high in level H, the signal h takes a level "1".

(2) For signal e high in level H and signal f low in level L, the signal h takes a level "2".

(3) For signal e low in level L and signal f high in level H, the signal h takes a level "3".

(4) For signals e, f both low in level L, the signal h takes a level "4".

The third comparator circuit 44 has a comparison level CL set at between the signal-h levels "2" and "3". For a signal h having levels "3" and "4", the third comparator circuit 44 has an output signal i that is low in level. For a signal h having levels "1" and "2", the signal i is high in level. Meanwhile, in the reverse-rotation detecting circuit 60, when the input signal h changes in level as "2", "4", "3" and "1" in this order, the logic circuit 62 makes a processing such that the output signal j is maintained low in level. Accordingly, by the fact the signal j becomes high in level, rotation can be detected reverse as to the magnetic movable 4 and hence the object-being-detected.

Figure 8:
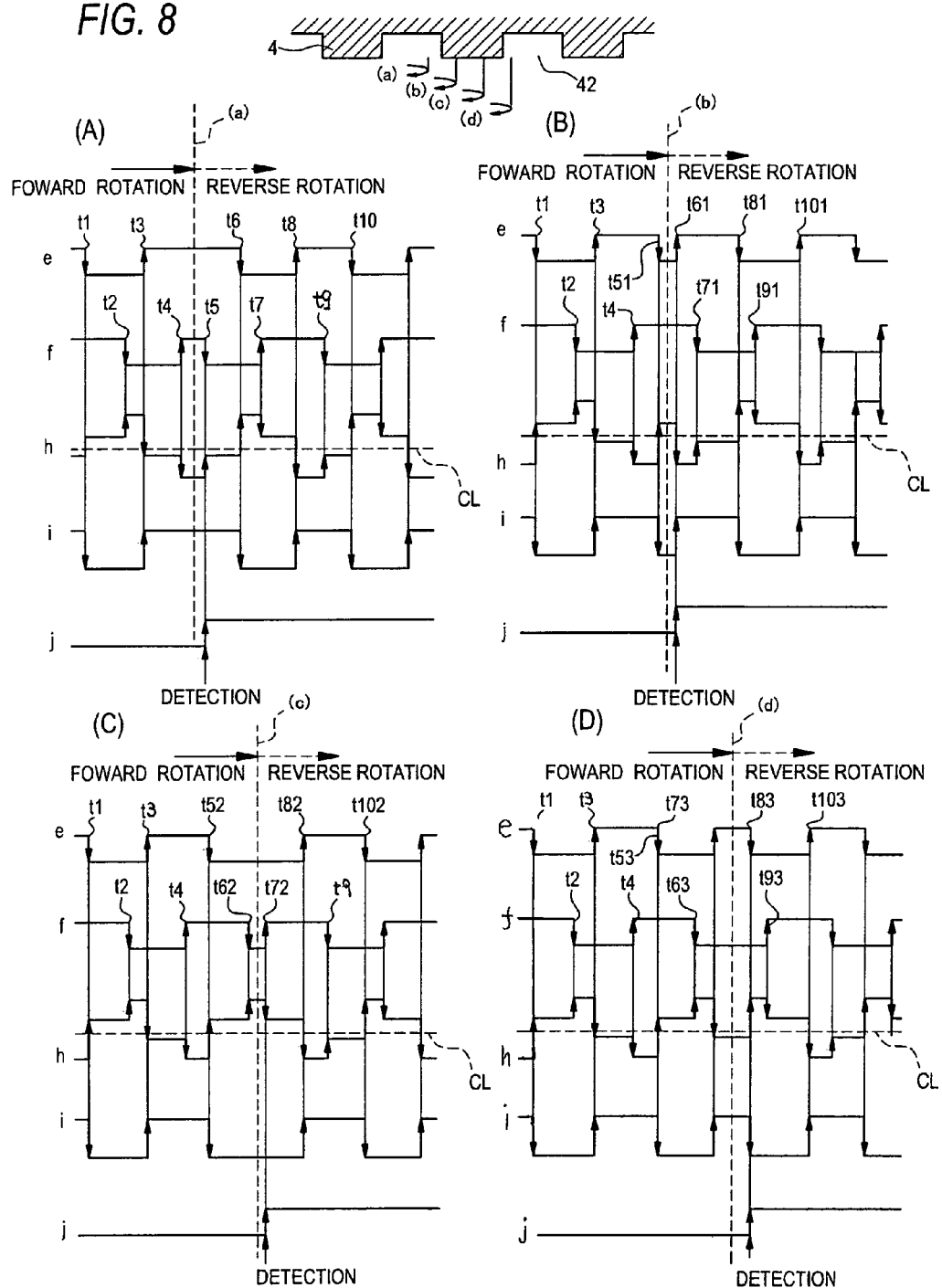
FIGS. 8A-8D are explanatory figures that explain the operation of the device according to the first embodiment of the invention.

FIG. 8A shows the waveforms of signals e, f, h, i, j on the respective terminals of the circuit shown in FIG. 6 in the case rotation is switched from forward to reverse when the magnetic movable 4 and the center MR element 22 of the magnet 1 (see FIG. 1) are relatively opposed in a position (a). Likewise, FIGS. 8B, 8C and 8D show the waveforms of the signals e, f, g, h, i, j in the case rotation is switched from forward to reverse when the magnetic movable 4 and the center MR element 22 of the magnet 1 are relatively opposed in a position (b), (c) or (d). The signal h changes in level in the order shown in FIG. 7A during a forward rotation of the magnetic movable 4, and in the order shown in FIG. 7B during a reverse rotation of the magnetic movable 4.

Namely, in the case the magnetic movable 4 is inverted in rotation in timing "a", the output signal i of the third comparator circuit 44 changes in level as "3", "4", "2" and "1" in the order due to the level change in the signals e, f at time t1, t2, t3, t4, as shown in FIG. 8A. Due to this, the output signal j of the reverse-rotation detecting circuit 60 is maintained low in level, to detect that the magnetic movable 4 is in a forward rotation.

When the magnetic movable 4 is inverted in rotation in time (a), the output signal i of the third comparator circuit 44 changes in level as "2", "4", "3" and "1" in the order due to the level change in the signals e, f at time t5, t6, t7, t8, t9, t10. Due to this, the output signal j of the reverse-rotation detecting circuit 60 changes into a high level. Accordingly, the signal j immediately changes into a high level at time t5 the signal falls immediately after the time (a) the magnetic movable 4 has changed into the reverse rotation. Thus, it is possible to detect a reverse rotation of the magnetic movable 4 without a significant delay.

Likewise, when the magnetic movable 4 is changed into a reverse rotation in timing (b), the signal j immediately changes into a high level at time t61 the signal e rises immediately after the time (b), as shown in FIG. 8B. Thus, it is possible to detect a reverse rotation of the magnetic movable 4 without a significant delay. Provided that the magnetic movable 4 is changed into a reverse rotation in timing (c), the signal j immediately changes into a high level at time t72 the signal f rises immediately after the time (c), as shown in FIG. 8C. Thus, it is possible to detect a reverse rotation of the magnetic movable 4 without a significant delay. Provided that the magnetic movable 4 is changed into a reverse rotation in timing (d), the signal j immediately changes into a high level at time t83 the signal e falls immediately after the time (d), as shown in FIG. 8D. Thus, it is possible to detect a reverse rotation of the magnetic movable 4 without a significant delay.

In this manner, according to the magnetic sensor in the first embodiment of the invention, a reverse rotation of a magnetic movable can be detected swiftly by a simple circuit structure and correctly without erroneous detections.

Second Embodiment

Figure 9:
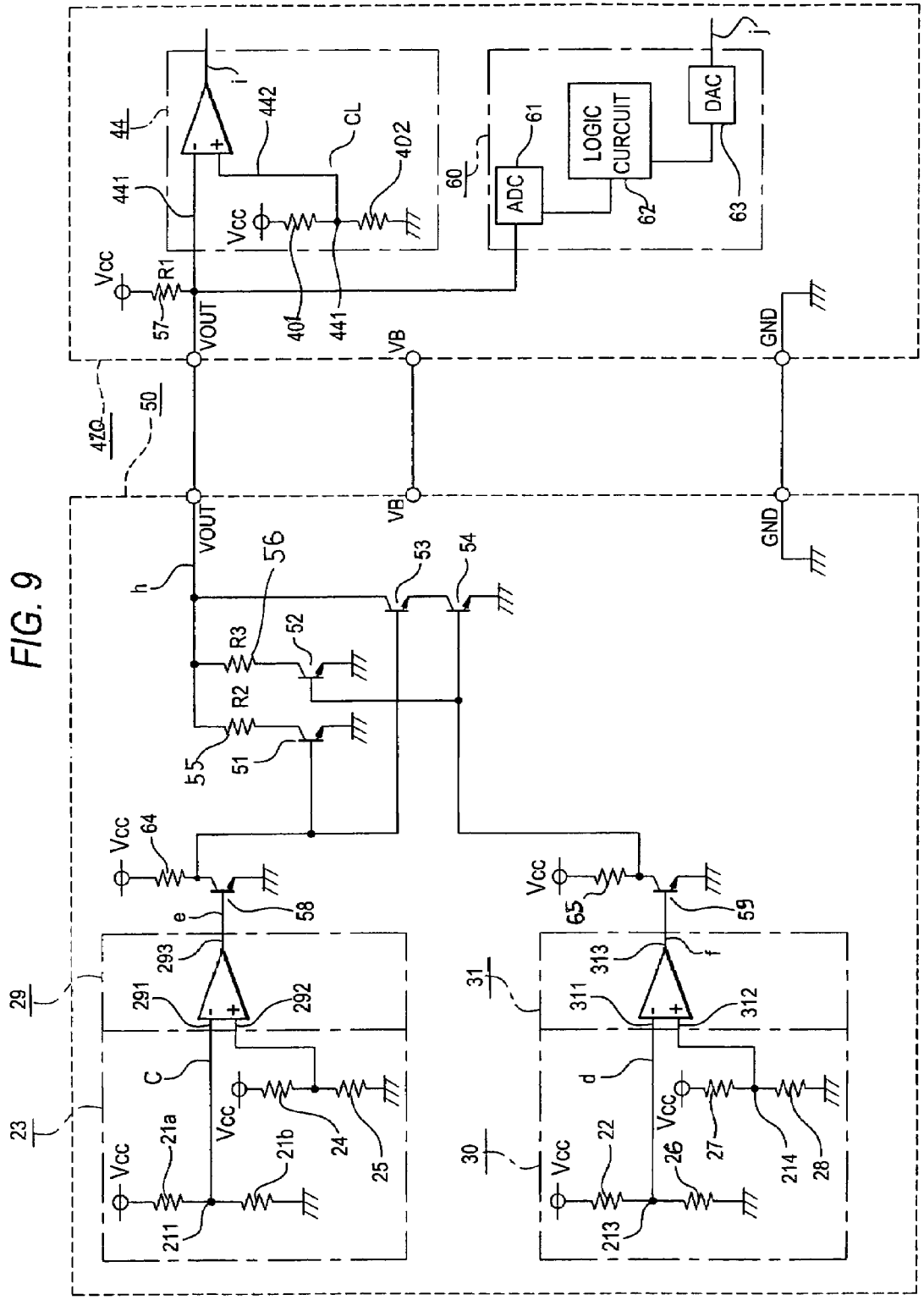
FIG. 9 is a circuit diagram of a device according to a second embodiment of the invention.
Figure 10:
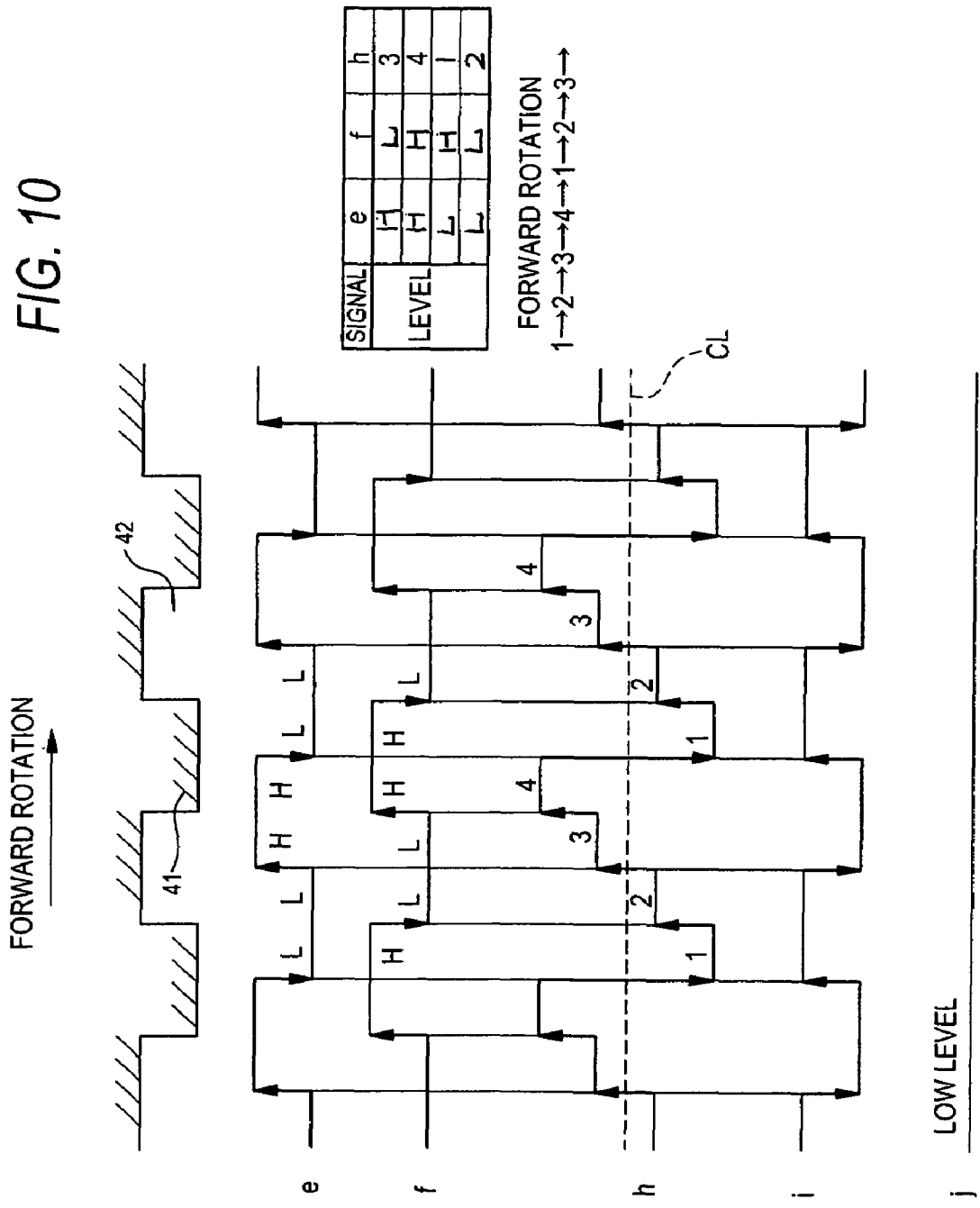
FIG. 10 is an explanatory figure that explains the operation of the device according to the second embodiment of the invention.

FIG. 9 is a circuit diagram showing a circuit configuration of a magnetic sensor according to a second embodiment of the invention. FIG. 10 is an explanatory figure that explains the operation of the magnetic movable 4 in a forward rotation. Like or corresponding elements to those in the foregoing art forming the basis of the invention are attached with the like numerals. In FIG. 9, a fifth, or output, transistor (hereinafter referred to as a fifth Tr) 58 has a base connected to an output terminal 293 of a first comparator circuit 29, a collector connected to the power source VCC through a resistance 64, and an emitter grounded. The respective bases of first and third Trs 51, 53 are connected to the collector of the fifth Tr 58.

A sixth, or output, transistor (hereinafter referred to as a sixth Tr) 59 has a base connected to an output terminal 313 of a second comparator circuit 31, a collector connected to a power source VCC through a resistance 65, and an emitter grounded. The respective bases of second and fourth Trs 52, 54 are connected to a collector of the sixth Tr 58.

The first Tr 51 has a collector directly connected to an output terminal VOUT of a sensor unit 50, and an emitter grounded. The second Tr 52 has a collector connected to an output terminal VOUT through a resistance 55, and an emitter grounded. The third Tr 53 has a collector connected to an output terminal VOUT through a resistance 56, and an emitter connected to a collector of the fourth Tr 54. The emitter of the fourth Tr 54 is grounded.

The other is similar in structure to the first embodiment.

The sensor unit 50 is supplied with power from a computer unit 420 through a power terminal VB while its ground terminal GND is grounded. Note that resistances 55, 56, 57 are assumed to have respective values R2, R3, R1.

Due to the rotation of the magnetic movable, resistance change takes place in the MR elements 21a, 21b, 22. By first and second bridge circuits 23, 30, two-system voltage changes are provided as signals c, d. The signals c, d are respectively converted by the first and second comparator circuits 29, 31 into rectangular waves, thus obtaining signals e, f. One signal, or rectangular wave, e is inputted to the base of the fifth Tr 58. The other signal, or rectangular wave, f is inputted to the base of the sixth Tr 59.

The signal h, outputted from the sensor unit 50, is delivered to the computer unit 420 and then pulled up to the power voltage Vcc. The signal h is inputted to the inverted input terminal of the third comparator circuit 44 where it is compared with a comparison level CL inputted to the non-inverted input terminal 442, thus obtaining a signal i. Meanwhile, the signal h is inputted to an ADC 61 of a reverse-rotation detecting circuit 60 where it is converted into a digital signal. The digital signal is passed through a logic circuit 62 and then re-converted by a DAC 63 into an analog form, thus obtaining a reverse-rotation detection signal j.

In the second embodiment of the invention, the MR elements 21a, 21b, 22 constitute a sensor section in the invention. The first and second bridge circuits 23, 30, the first and second comparator circuits 29, 31 and the first to sixth Trs 51, 52, 53, 54, 58, 59 constitute a signal forming section in the invention. The third comparator circuit 44 and the reverse-rotation detecting circuit 60 constitute a determining section in the invention. Furthermore, the first and second bridge circuits 23, 30 and the first and second comparator circuits 29, 31 constitute a converting circuit in the invention. The first to sixth Trs 51, 52, 53, 54, 58, 59 constitute a signal forming circuit in the invention.

FIG. 10 is an explanatory figure showing the waveforms of the signals e, f, h, i, j in a forward rotation of the magnetic movable.

Referring to FIGS. 9 and 10, the operation is now described as to the magnetic sensor in the second embodiment of the invention. In FIG. 10, signals e, f respectively occur as rectangular waves, as shown in the figure, on the output terminals 293, 313 of the first and second comparator circuits 29, 31. Due to forward rotation of the magnetic movable 4, the MR elements 21a, 22, 21b become opposite, in the order, to the convex 41 of the magnetic movable 4. Hence, the signal e is advanced a predetermined amount of phase relative to the signal f. In one period the MR element is opposed to the convex 41 and concave 42 of the magnetic movable 4, there occur four patterns of combinations of high and low levels H, L of the signals e, f. The different combinations of those provide four patterns of signal-h levels "1", "2", "3", "4" different one from another. For this reason, the convex 41 and concave 42 of the magnetic movable 4 can be detected with a quarter period depending upon the level difference in the signal h.

More specifically, the level change in the signal h is described in detail in the following.

(1) With signal e Low in Level L and Signal f High in Level H

The first and third Trs 51, 53 are conductive, so that the signal h takes the level of grounding GND. In FIG. 10, the signal-h level in this case is shown at "1".

(2) With Signals e, f Both Low in Level L

The first to fourth Trs 51, 52, 53, 54 are conductive. This provides:

$$\text{signal } h = VCC \times \{(R2 \times R3)/(R2+R3)\}/[R1 + \{(R2 \times R3)/(R2+R3)\}].$$

In FIG. 10, the signal-h level in this case is shown at "2".

(3) With Signal e High in Level H and Signal f Low in Level L

The first and third Trs 51, 53 are non-conductive whereas the second and fourth Trs 52, 54 are conductive. This provides:

$$\text{signal } h = VCC \times \{R2/(R1+R2)\}.$$

In FIG. 10, the signal-h level in this case is shown at "3".

(4) With Signals e, f Both High in Level H

The first to fourth Trs 51, 52, 53, 54 are all non-conductive, so that the signal h takes the level of power voltage VCC. In FIG. 10, the signal-h level in this case is shown at "4".

If it is now assumed that VCC=3 [V], R1=2 [KΩ], R2=4 [KΩ], R3=4/3 [KΩ] and each Tr's Vsat=0, then the following results:

level "1" of the signal h=0 [V]
level "2" of the signal h=1 [V]
level "3" of the signal h=2 [V]
level "4" of the signal h=3 [V].

As shown in the figure, the output signal h of the sensor unit 50 changes the greatest at the center of the convex 41 of the magnetic movable 4.

The third comparator circuit 44 has a comparison level CL set at between the signal-h levels "2" and "3". For a signal h having levels "3" and "4", the third comparator circuit 44 has an output signal i that is low in level. For a signal h having levels "1" and "2", the signal i is high in level. Meanwhile, in the reverse-rotation detecting circuit 60, when the input signal h changes in level as "1", "2", "3" and "4" in this order, the logic circuit 62 makes a processing such that the output signal j is maintained low in level. Accordingly, by the fact the signal j is low in level, rotation can be detected forward as to the magnetic movable 4 and hence the object-being-detected.

Although there is no showing of the waveforms of the signals e, f, h, i, j in a reverse rotation of the magnetic movable 4, the signal e occurs with a delay in a predetermined amount of phase relative to the signal f upon a reverse rotation of the magnetic movable 4 as noted in the first embodiment. The signal waveforms in this case can be shown by inverting all the arrows in FIG. 10. Namely, in the case of reverse rotation of the magnetic movable 4, the signal h changes in level as "4", "3", "2" and "1" in the order.

The third comparator circuit 44 has a comparison level CL set at between the signal-h levels "2" and "3". For a signal h having levels "3" and "4", the third comparator circuit 44 has an output signal i that is low in level similarly to the case of forward rotation. For a signal h having levels "1" and "2", the signal i is high in level. Meanwhile, in the reverse-rotation detecting circuit 60, when the input signal h changes in level as "4", "3", "2" and "1" in this order, the logic circuit 62 makes a processing such that the output signal j is maintained high in level. Accordingly, by the fact the signal j becomes high in level, rotation can be detected reverse as to the magnetic movable 4 and hence the object-being-detected.

In the second embodiment, the order of signal-h level change is different from that of the first embodiment. However, similarly to the first embodiment shown in FIG. 8, even in the case the magnetic movable 4 is inverted in rotation at any of time points (a), (b), (c) and (d), the signal j immediately changes in level from low to high at a time that any of the signals e, f first changed in level after that time. According to the magnetic sensor in the second embodiment of the invention, a reverse rotation of a magnetic movable can be detected swiftly by a simple circuit structure and correctly without erroneous detections. Thus, a reverse rotation of the magnetic movable 4 can be detected swiftly and correctly without erroneous detections.

Third Embodiment

Figure 11:
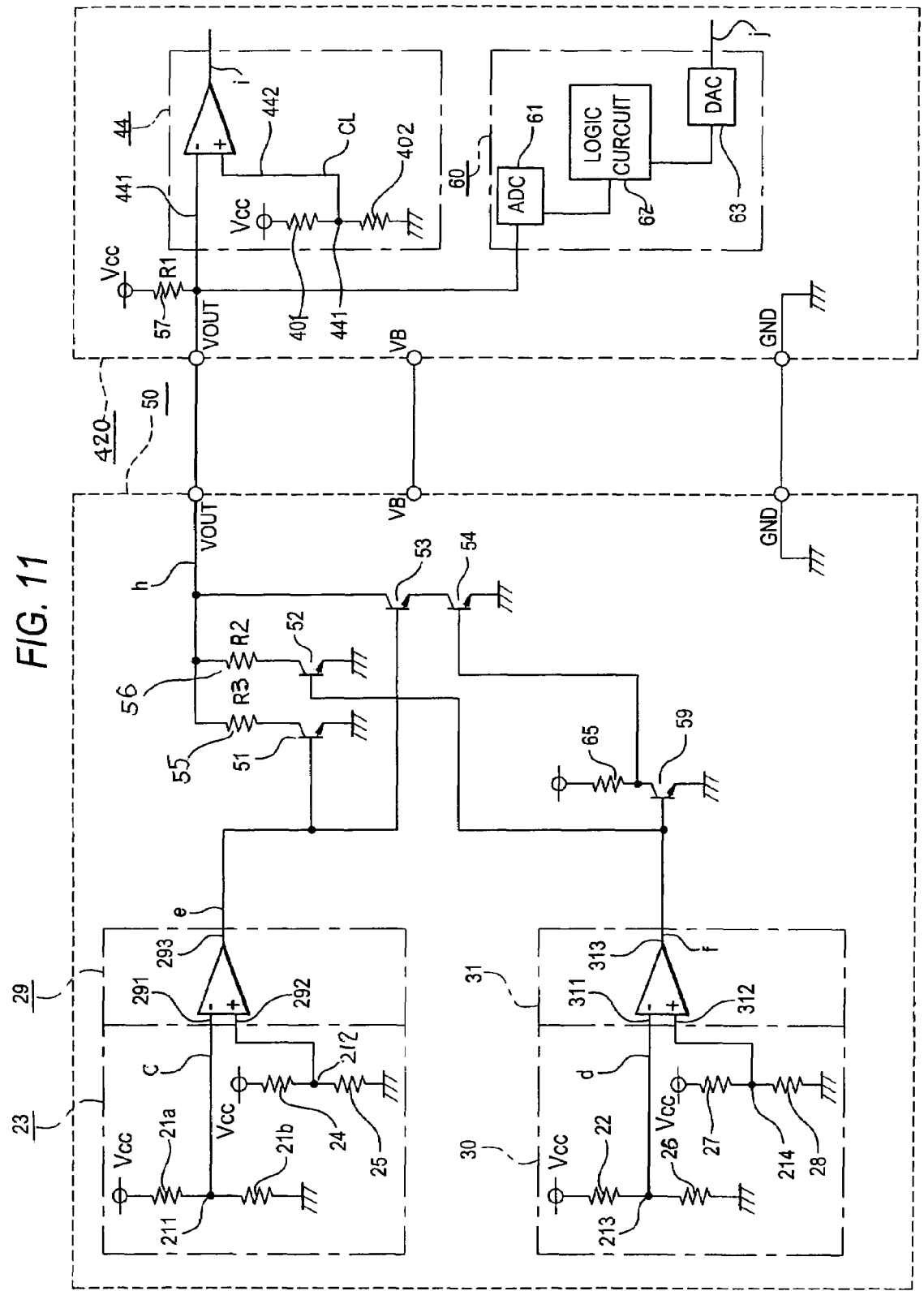
FIG. 11 is a circuit diagram of a device according to a third embodiment of the invention.
Figure 12:
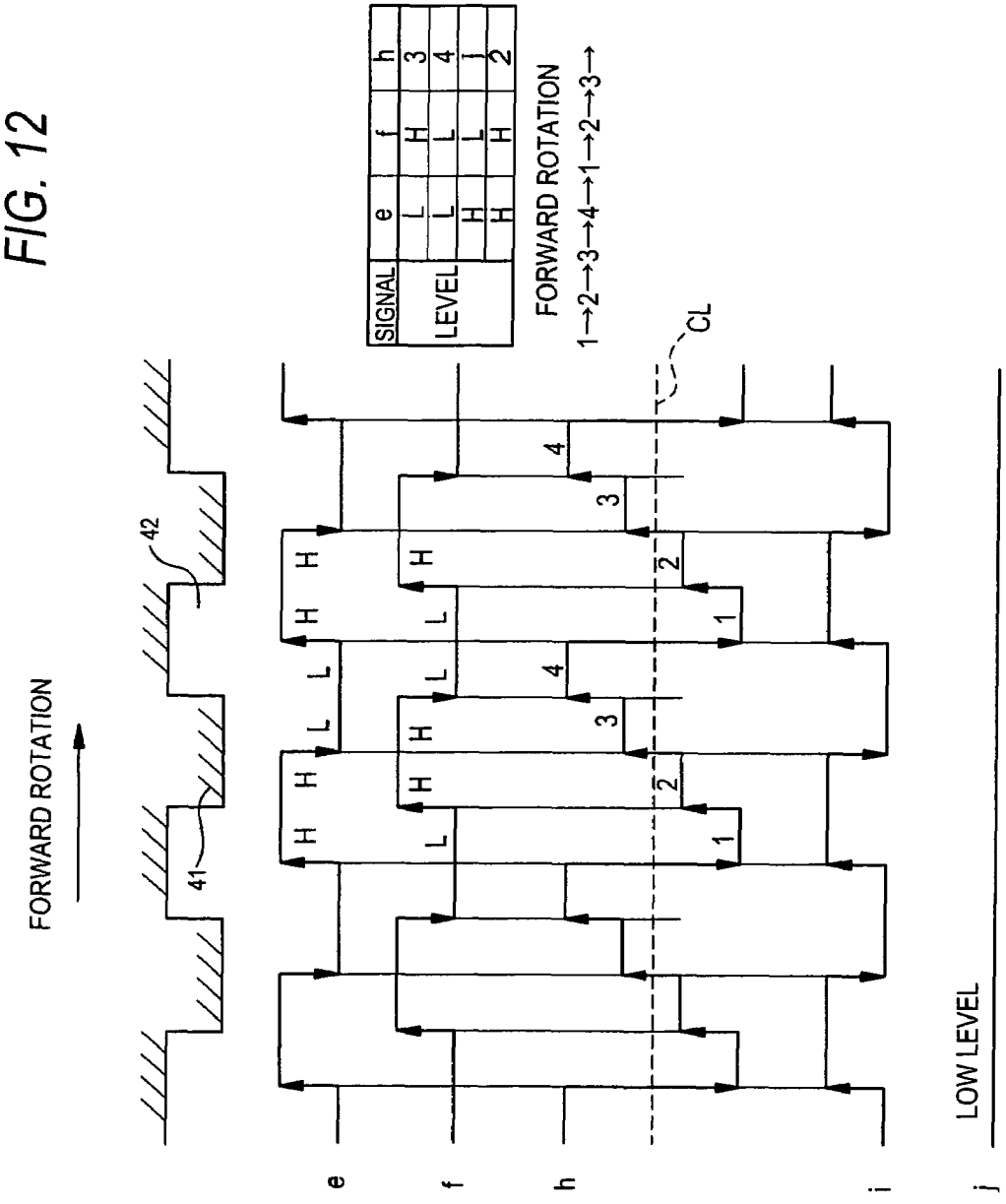
FIG. 12 is an explanatory figure that explains the operation of the device according to the third embodiment of the invention.

FIG. 11 is a circuit diagram showing a circuit configuration of a magnetic sensor according to a third embodiment of the invention. FIG. 12 is an explanatory figure that explains the operation of the magnetic movable 4 in a forward rotation. Like or corresponding elements to those in the first and second embodiments are attached with the like numerals. In FIG. 11, a sixth, or output, transistor 59 has a base connected to an output terminal 313 of a second comparator circuit 31, a collector connected to the power source VCC through a resistance 65, and an emitter grounded. There is no provision of a transistor corresponding to the fifth Tr 58 in the second embodiment.

A second Tr 52 has a base connected to an output terminal 313 of a second comparator circuit 31, a collector connected to an output terminal VOUT of a sensor unit 50 through a resistance 56, and an emitter grounded. The base of the fourth Tr 54 is connected to the collector of the sixth Tr 59, and the emitter thereof is grounded.

The first Tr 51 has a base connected to an output terminal 293 of the first comparator circuit 29, a collector connected to a power terminal VOUT through a resistance 55, and an emitter grounded. The third Tr 53 has a base connected to an output terminal 293 of the first comparator circuit 29, a collector directly connected to the power terminal VOUT, and an emitter connected to the collector of the fourth Tr 54.

The other is similar in structure to the first and second embodiments.

The sensor unit 50 is supplied with power from a computer unit 49 through a power terminal VB while its ground terminal GND is grounded. Note that resistances 55, 56, 57 are assumed to have respective values R3, R2, R1.

Due to the rotation of the magnetic movable, resistance change takes place in the MR elements 21a, 21b, 22, to provide two-system voltage changes as signals c, d by means of first and second bridge circuits 23, 30. The signals c, d are respectively converted by first and second comparator circuits 29, 31 into rectangular waves, thus obtaining signals e, f. One signal, or rectangular wave, e is inputted to the bases of the first and third Trs 51, 53. The other signal, or rectangular wave, f is inputted to the bases of the second and sixth Trs 52, 65.

The signal h, outputted from the sensor unit 50, is delivered to the computer unit 42 and then pulled up to the power voltage Vcc. The signal h is inputted to the inverted input terminal of the third comparator circuit 44 where it is compared with a comparison level CL inputted to the non-inverted input terminal 442, thus obtaining a signal i. Meanwhile, the signal h is inputted to an ADC 61 of a reverse-rotation detecting circuit 60 where it is converted into a digital signal. The digital signal is passed through a logic circuit 62 and then re-converted by a DAC 63 into an analog form, thus obtaining a reverse-rotation detection signal j.

In the third embodiment of the invention, the MR elements 21a, 21b, 22 constitute a sensor section in the invention. The first and second bridge circuits 23, 30, the first and second comparator circuits 29, 31 and the first to fourth and sixth Trs 51, 52, 53, 54, 59 constitute a signal forming section in the invention. The third comparator circuit 44 and the reverse-rotation detecting circuit 60 constitute a determining section in the invention. Furthermore, the first and second bridge circuits 23, 30 and the first and second comparator circuits 29, 31 constitute a converting circuit in the invention. The first to fourth and sixth Trs 51, 52, 53, 54, 59 constitute a signal forming circuit in the invention.

FIG. 12 is an explanatory figure showing the waveforms of the signals e, f, h, i, j in a forward rotation of the magnetic movable.

Referring to FIGS. 11 and 12, the operation is now described as to the magnetic sensor in the third embodiment of the invention. In FIG. 12, signals e, f respectively occur as rectangular waves, as shown in the figure, on the output terminals 293, 313 of the first and second comparator circuits 29, 31. Due to forward rotation of the magnetic movable 4, the MR elements 21a, 22, 21b become opposite, in the order, to the convex 41 of the magnetic movable 4. Hence, the signal e is advanced a predetermined amount of phase relative to the signal f. In one period the MR element is opposed to the convex 41 and concave 42 of the magnetic movable 4, there occur four patterns of combinations of high and low levels H, L of the signals e, f. The different combinations of those provide four patterns of signal-h levels "1", "2", "3", "4" different one from another. For this reason, the convex 41 and concave 42 of the magnetic movable 4 can be detected with a quarter period depending upon the level difference in the signal h.

More specifically, the level change in the signal h is described in detail in the following.

(1) With Signal e High in Level H and Signal f Low in Level L

The first, third and fourth Trs 51, 53, 54 are conductive, so that the signal h takes the level of grounding GND. In FIG. 12, the signal-h level in this case is shown at "1".

(2) With Signals e, f Both High in Level H

The first to third Trs 51, 52, 53 are conductive whereas the fourth Tr 54 is non-conductive. This provides:

signal $h = VCC \times \{(R2 \times R3)/(R2+R3)\}/[R1+\{(R2 \times R3)/(R2+R3)\}]$.

In FIG. 12, the signal-h level in this case is shown at "2".

(3) With Signal e Low in Level L and Signal f High in Level H

The second and sixth Trs 52, 59 are conductive whereas the first and third Trs 51, 53 are non-conductive. This provides:

signal $h = VCC \times \{R2/(R1+R2)\}$.

In FIG. 12, the signal-h level in this case is shown at "3".

(4) With Signals e, f Both Low in Level L

The first to third Trs 51, 52, 53 are non-conductive, so that the signal h takes the level of power voltage VCC. In FIG. 12, the signal-h level in this case is shown at "4".

If it is now assumed that VCC=3 [V], R1=2 [KΩ], R2=4 [KΩ], R3=⅔ [KΩ] and each Tr's Vsat=0, then the following results:

level "1" of the signal h=0 [V]
level "2" of the signal h=1 [V]
level "3" of the signal h=2 [V]
level "4" of the signal h=3 [V].

As shown in the figure, the output signal h of the sensor unit 50 changes the greatest at the center of the convex 42 of the magnetic movable 4.

The third comparator circuit 44 has a comparison level CL set at between the signal-h levels "2" and "3". For a signal h having levels "3" and "4", the third comparator circuit 44 has an output signal i that is low in level. For a signal h having levels "1" and "2", the signal i is high in level. Meanwhile, in the reverse-rotation detecting circuit 60, when the input signal h changes in level as "1", "2", "3" and "4" in this order, the logic circuit 62 makes a processing such that the output signal j is maintained low in level. Accordingly, by the fact the signal j is low in level, rotation can be detected forward as to the magnetic movable 4 and hence the object-being-detected.

Although there is no showing of the waveforms of the signals e, f, h, i, j in a reverse rotation of the magnetic movable 4, the signal e occurs with a delay in a predetermined amount of phase relative to the signal f upon a reverse rotation of the magnetic movable 4 as noted in the first embodiment. The signal waveforms in this case can be shown by inverting all the arrows in FIG. 12. Namely, in the case of reverse rotation of the magnetic movable 4, the signal h changes in level as "4", "3", "2" and "1" in the order.

The third comparator circuit 44 has a comparison level CL set at between the signal-h levels "2" and "3". For a signal h having levels "3" and "4", the third comparator circuit 44 has an output signal i that is low in level similarly to the case of forward rotation. For a signal h having levels "1" and "2", the signal i is high in level. Meanwhile, in the reverse-rotation detecting circuit 60, when the input signal h changes in level as "4", "3", "2" and "1" in this order, the logic circuit 62 makes a processing such that the output signal j is maintained high in level. Accordingly, by the fact the signal j becomes high in level, rotation can be detected reverse as to the magnetic movable 4 and hence the object-being-detected.

In the third embodiment, the order of signal-h level change is different from that of the first embodiment. However, similarly to the first embodiment shown in FIGS. 8A-8D, even in the case the magnetic movable 4 is inverted in rotation at any of time points (a), (b), (c) and (d), the signal j immediately changes in level from low to high at a time that any of the signals e, f first changed in level after that time. According to the magnetic sensor in the third embodiment of the invention, reverse rotation of a magnetic movable can be detected swiftly by a simple circuit structure and correctly without erroneous detections. Thus, reverse rotation of the magnetic movable 4 can be detected swiftly and correctly without erroneous detections.

Fourth Embodiment

Figure 13:
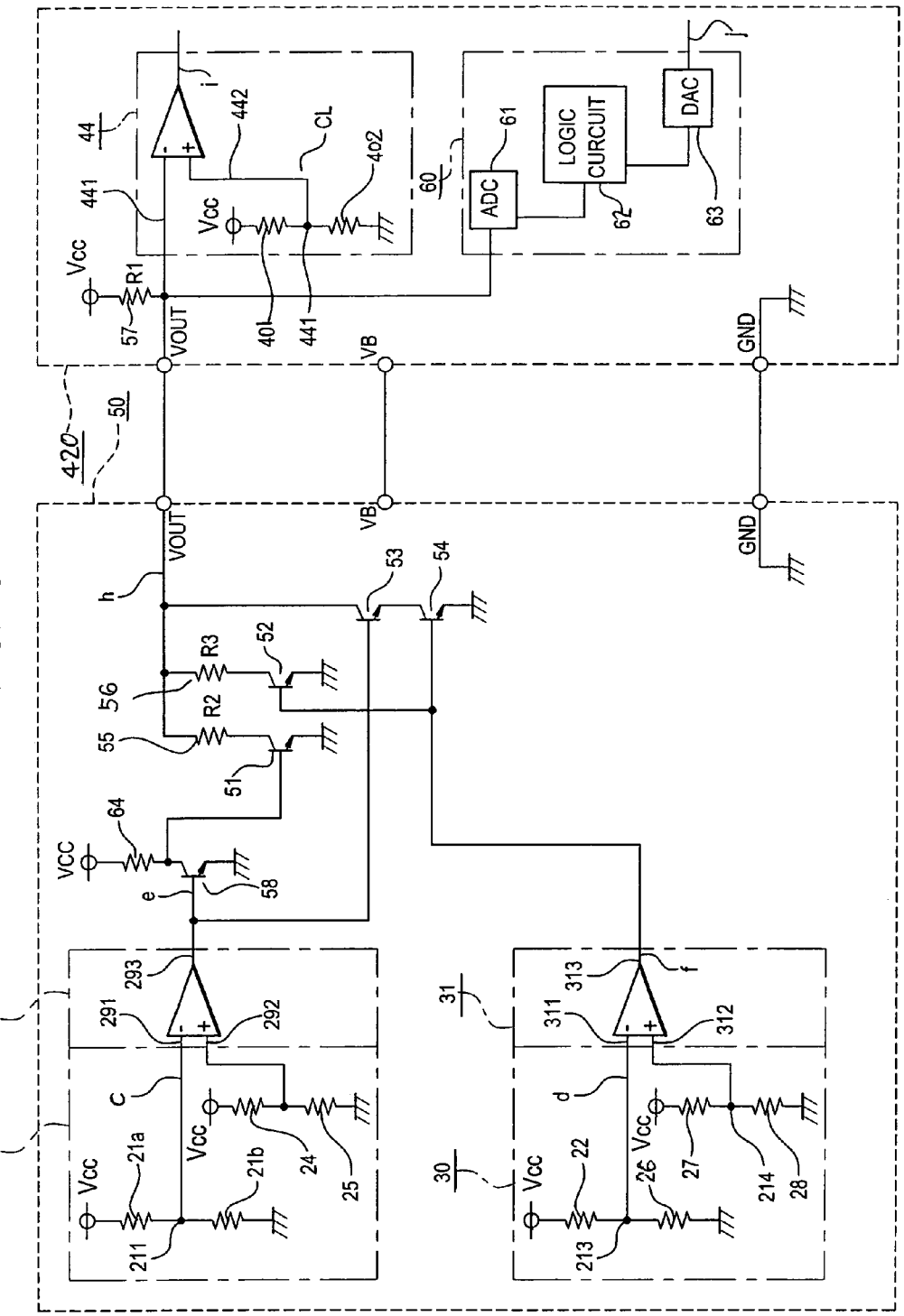
FIG. 13 is a circuit diagram of a device according to a fourth embodiment of the invention.
Figure 14:
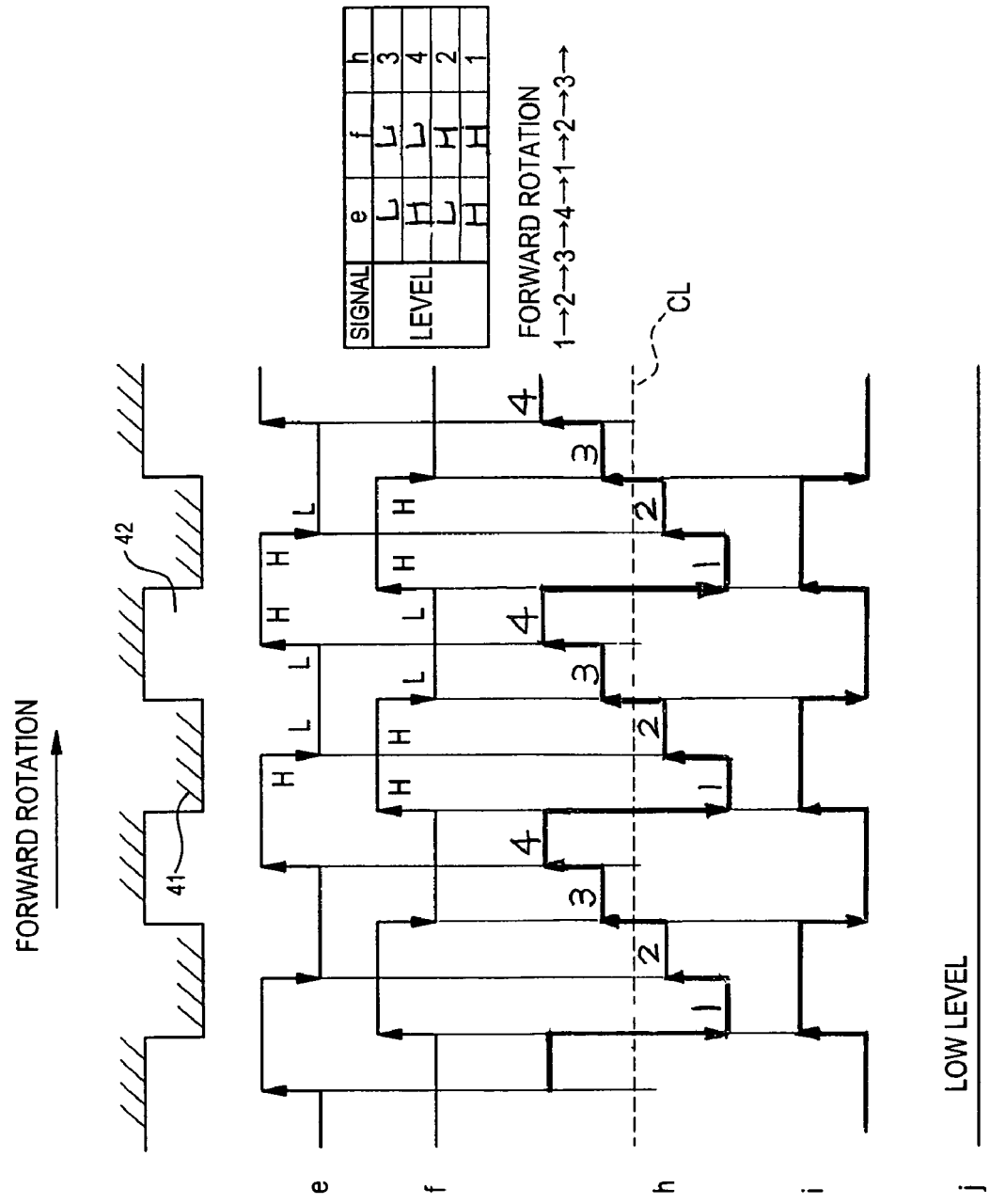
FIG. 14 is an explanatory figure that explains the operation of the device according to the fourth embodiment of the invention.

FIG. 13 is a circuit diagram showing a circuit configuration of a magnetic sensor according to a fourth embodiment of the invention. FIG. 14 is an explanatory figure that explains the operation of the magnetic movable 4 in a forward rotation. Like or corresponding elements to those in the first, second and third embodiments are attached with the like numerals. In FIG. 13, a fifth, or output, transistor Tr 58 has a base connected to an output terminal 293 of a first comparator circuit 29, a collector connected to the power voltage VCC through a resistance 64, and an emitter grounded. There is no provision of a transistor corresponding to the sixth Tr 59 in the second embodiment.

A first Tr 51 has a base connected to a collector of a fifth Tr 58, and an emitter grounded. A second Tr 52 has a base connected to an output terminal 313 of a second comparator circuit 31, a collector connected to an output terminal VOUT of a sensor unit 50 through a resistance 56, and an emitter grounded. A third Tr 53 has a base connected to an output terminal 293 of a first comparator circuit 29, a collector directly connected to a power terminal VOUT, and an emitter connected to a collector of a fourth Tr 54. The fourth Tr 54 has a base connected to the output terminal 313 of the second comparator circuit 31, and an emitter grounded.

The other is similar in structure to the first to third embodiments.

The sensor unit 50 is supplied with power from a computer unit 49 through a power terminal VB while its ground terminal GND is grounded. Note that resistances 55, 56, 57 are assumed to have respective values R2, R3, R1.

Due to the rotation of the magnetic movable, resistance change takes place in the MR elements 21a, 21b, 22, to provide two-system voltage changes as signals c, d by means of first and second bridge circuits 23, 30. The signals c, d are respectively converted by the first and second comparator circuits 29, 31 into rectangular waves, thus obtaining signals e, f. One signal, or rectangular wave, e is inputted to the bases of the fifth and third Trs 58, 53. The other signal, or rectangular wave, f is inputted to the bases of the second and fourth Trs 52, 54.

The signal h, outputted from the sensor unit 50, is delivered to the computer unit 42 and then pulled up to the power voltage Vcc. The signal h is inputted to the inverted input terminal of the third comparator circuit 44 where it is compared with a comparison level CL inputted to the non-inverted input terminal 442, thus obtaining a signal i. Meanwhile, the signal h is inputted to an ADC 61 of a reverse-rotation detecting circuit 60 where it is converted into a digital signal. The digital signal is passed through a logic circuit 62 and then re-converted by a DAC 63 into an analog form, thus obtaining a reverse-rotation detection signal j.

In the fourth embodiment of the invention, the MR elements 21a, 21b, 22 constitute a sensor section in the invention. The first and second bridge circuits 23, 30, the first and second comparator circuits 29, 31 and the first to fourth and fifth Trs 51, 52, 53, 54, 58 constitute a signal forming section in the invention. The third comparator circuit 44 and the reverse-rotation detecting circuit 60 constitute a determining section in the invention. Furthermore, the first and second bridge circuits 23, 30 and the first and second comparator circuits 29, 31 constitute a converting circuit in the invention. The first to fourth and fifth Trs 51, 52, 53, 54, 58 constitute a signal forming circuit in the invention.

FIG. 14 is an explanatory figure showing the waveforms of the signals e, f, h, i, j in a forward rotation of the magnetic movable.

Referring to FIGS. 13 and 14, the operation is now described as to the magnetic sensor in the fourth embodiment of the invention. In FIG. 14, signals e, f respectively occur as rectangular waves, as shown in the figure, on the output terminals 293, 313 of the first and second comparator circuits 29, 31. Due to forward rotation of the magnetic movable 4, the MR elements 21a, 22, 21b become opposite, in the order, to the convex 41 of the magnetic movable 4. Hence, the signal e is advanced a predetermined amount of phase relative to the signal f. In one period the MR element is opposed to the convex 41 and concave 42 of the magnetic movable 4, there occur four patterns of combinations of high and low levels H, L of the signals e, f. The different combinations of those provide four patterns of signal-h levels "1", "2", "3", "4" different one from another. For this reason, the convex 41 and concave 42 of the magnetic movable 4 can be detected with a quarter period depending upon the level difference in the signal h.

More specifically, the level change in the signal h is described in detail in the following.

(1) With Signals e, f Both High in Level H

The fifth, third, second and fourth Trs 58, 53, 52, 54 are conductive, so that the signal h takes the level of grounding GND. In FIG. 14, the signal-h level in this case is shown at "1".

(2) With Signal e Low in Level L and Signal f High in Level H

The first, second and fourth Trs 51, 52, 54 are conductive. This provides:

$$\text{signal } h = VCC \times \{(R2 \times R3)/(R2+R3)\}/[R1+\{(R2 \times R3)/(R2+R3)\}].$$

In FIG. 14, the signal-h level in this case is shown at "2".

(3) With Signals, e, f Both Low in Level L

The first Tr 51 is conductive whereas the other transistors are non-conductive. This provides:

$$\text{signal } h = VCC \times \{R2/(R1+R2)\}.$$

In FIG. 14, the signal-h level in this case is shown at "3".

(4) With Signal e High in Level H and Signal f Low in Level L

The fifth and third Trs 58, 53 are conductive whereas the other transistors are non-conductive, so that the signal h takes the level of power voltage VCC. In FIG. 14, the signal-h level in this case is shown at "4".

If it is now assumed that VCC=3 [V], R1=2 [KΩ], R2=4 [KΩ], R3=4/3 [KΩ] and each Tr's Vsat=0, then the following results:

level "1" of the signal h=0 [V]
level "2" of the signal h=1 [V]
level "3" of the signal h=2 [V]
level "4" of the signal h=3 [V].

As shown in the figure, the output signal h of the sensor unit 50 changes the greatest at the rise edge of the convex 41 of the magnetic movable 4.

The third comparator circuit 44 has a comparison level CL set at between the signal-h levels "2" and "3". For a signal h having levels "3" and "4", the third comparator circuit 44 has an output signal i that is low in level. For a signal h having levels "1" and "2", the signal i is high in level. Meanwhile, in the reverse-rotation detecting circuit 60, when the input signal h changes in level as "1", "2", "3" and "4" in this order, the logic circuit 62 makes a processing such that the output signal j is maintained low in level. Accordingly, by the fact the signal j is low in level, rotation can be detected forward as to the magnetic movable 4 and hence the object-being-detected.

Although there is no showing of the waveforms of the signals e, f, h, i, j in a reverse rotation of the magnetic movable 4, the signal e occurs with a delay in a predetermined amount of phase relative to the signal f upon a reverse rotation of the magnetic movable 4 as noted in the first embodiment. The signal waveforms in this case can be shown by inverting all the arrows in FIG. 14. Namely, in the case of reverse rotation of the magnetic movable 4, the signal h changes in level as "4", "3", "2" and "1" in the order.

The third comparator circuit 44 has a comparison level CL set at between the signal-h levels "2" and "3". For a signal h having levels "3" and "4", the third comparator circuit 44 has an output signal i that is low in level similarly to the case of forward rotation. For a signal h having levels "1" and "2", the signal i is high in level. Meanwhile, in the reverse-rotation detecting circuit 60, when the input signal h changes in level as "4", "3", "2" and "1" in this order, the logic circuit 62 makes a processing such that the output signal j is maintained high in level. Accordingly, by the fact the signal j becomes high in level, rotation can be detected reverse as to the magnetic movable 4 and hence the object-being-detected.

In the fourth embodiment, the order of signal-h level change is different from that of the first embodiment. However, similarly to the first embodiment shown in FIG. 8, even in the case the magnetic movable 4 is inverted in rotation at any of time points (a), (b), (c) and (d), the signal j immediately changes in level from low to high at a time that any of the signals e, f first changed in level after that time. According to the magnetic sensor in the fourth embodiment of the invention, reverse rotation of a magnetic movable can be detected swiftly by a simple circuit structure and correctly without erroneous detections. Thus, reverse rotation of the magnetic movable 4 can be detected swiftly and correctly without erroneous detections.

Fifth Embodiment

Figure 15:
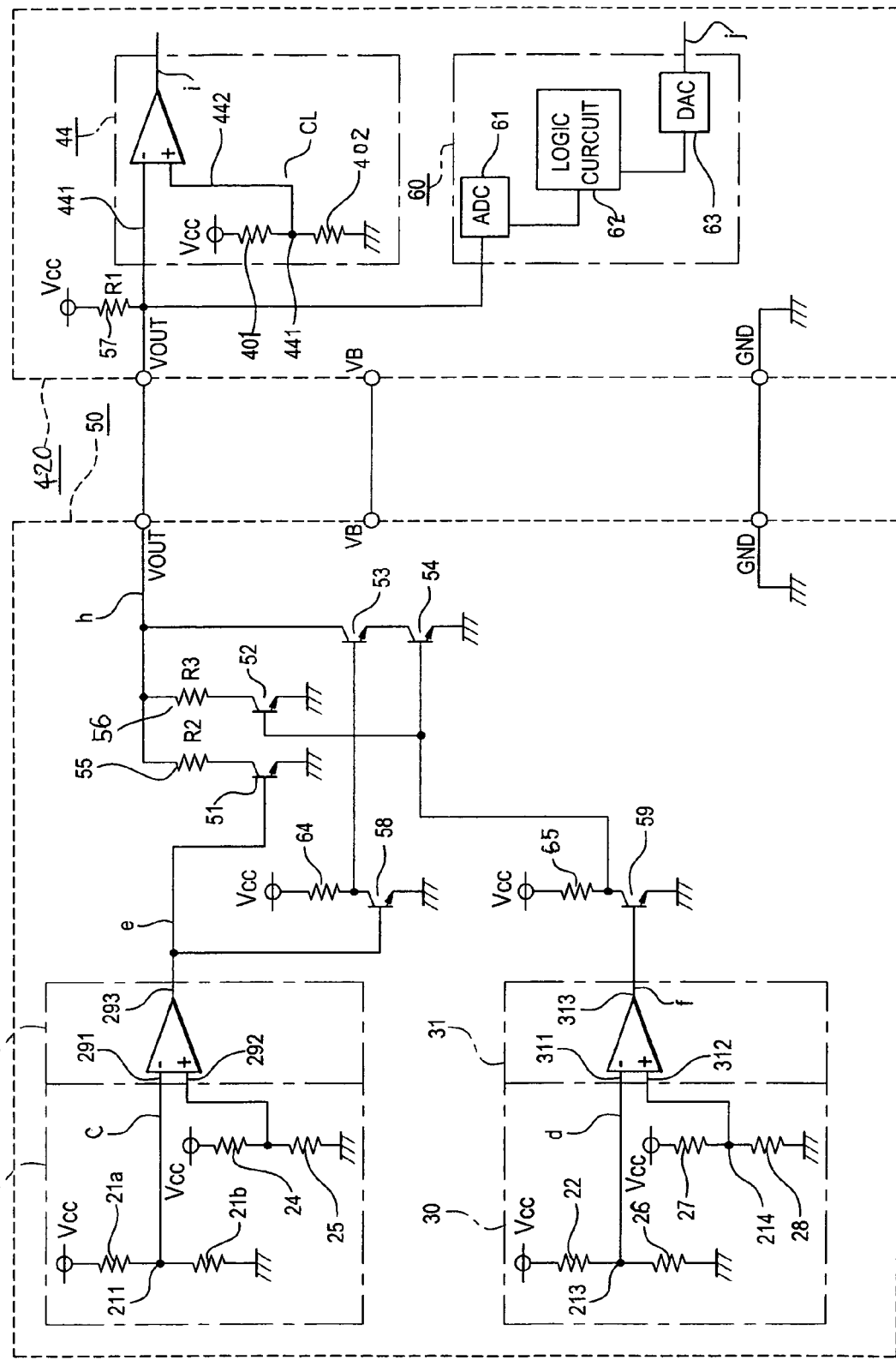
FIG. 15 is a circuit diagram of a device according to a fifth embodiment of the invention.

FIG. 15 is a circuit diagram showing a circuit configuration of a magnetic sensor according to a fifth embodiment of the invention. FIG. 16 is an explanatory figure that explains the operation of the magnetic movable 4 in a forward rotation. Like or corresponding elements to those in the first, second, third and fourth embodiments are attached with the like numerals. In FIG. 15, a fifth Tr 58 has a base connected to an output terminal 293 of a first comparator circuit 29, a collector connected to the power source VCC through a resistance 64, and an emitter grounded. A sixth Tr 59 has a base connected to an output terminal 313 of a second comparator circuit 31, and a collector connected to the power source VCC through a resistance 65.

A first Tr 51 has a base connected to an output terminal 293 of the first comparator circuit 29, a collector connected to an output terminal VOUT of a sensor unit 50 through a resistance 55, and an emitter grounded. A second Tr 52 has a base connected to a collector of the sixth Tr 59, and an emitter grounded. A third Tr 53 has a base connected to a collector of the fifth Tr 58. A fourth Tr 54 has a base connected to the collector of the sixth Tr 59, and an emitter grounded.

The other is similar in structure to the first, second, third and fourth embodiments.

The sensor unit 50 is supplied with power from a computer unit 420 through a power terminal VB while its ground terminal GND is grounded. Note that resistances 55, 56, 57 are assumed to have respective values R2, R3, R1.

Due to the rotation of the magnetic movable, resistance change takes place in the MR elements 21a, 21b, 22, to provide two-system voltage changes as signals c, d by means of first and second bridge circuits 23, 30. The signals c, d are respectively converted by the first and second comparator circuits 29, 31 into rectangular waves, thus obtaining signals e, f. One signal, or rectangular wave, e is inputted to the bases of the fifth and first Trs 58, 51. The other signal, or rectangular wave, f is inputted to the bases of the sixth Trs 59.

The signal h, outputted from the sensor unit 50, is delivered to the computer unit 420 and then pulled up to the power voltage Vcc. The signal h is inputted to the inverted input terminal of the third comparator circuit 44 where it is compared with a comparison level CL inputted to the non-inverted input terminal 442, thus obtaining a signal i. Meanwhile, the signal h is inputted to an ADC 61 of a reverse-rotation detecting circuit 60 where it is converted into a digital signal. The digital signal is passed through a logic circuit 62 and then re-converted by a DAC 63 into an analog form, thus obtaining a reverse-rotation detection signal j.

In the fifth embodiment of the invention, the MR elements 21a, 21b, 22 constitute a sensor section in the invention. The first and second bridge circuits 23, 30, the first and second comparator circuits 29, 31 and the first to sixth Trs 51, 52, 53, 54, 58, 59 constitute a signal forming section in the invention. The third comparator circuit 44 and the reverse-rotation detecting circuit 60 constitute a determining section in the invention. Furthermore, the first and second bridge circuits 23, 30 and the first and second comparator circuits 29, 31 constitute a converting circuit in the invention. The first to sixth Trs 51, 52, 53, 54, 58, 59 constitute a signal forming circuit in the invention.

FIG. 16 is an explanatory figure showing the waveforms of the signals e, f, h, i, j in a forward rotation of the magnetic movable.

Referring to FIGS. 15 and 16, the operation is now described as to the magnetic sensor in the fifth embodiment of the invention. In FIG. 16, signals e, f respectively occur as rectangular waves, as shown in the figure, on the output terminals 293, 313 of the first and second comparator circuits 29, 31. Due to forward rotation of the magnetic movable 4, the MR elements 21a, 22, 21b become opposite, in the order, to the convex 41 of the magnetic movable 4. Hence, the signal e is advanced a predetermined amount of phase relative to the signal f. In one period the MR element is opposed to the convex 41 and concave 42 of the magnetic movable 4, there occur four patterns of combinations of high and low levels H, L of the signals e, f. The different combinations of those provide four patterns of signal-h levels "1", "2", "3", "4" different one from another. For this reason, the convex 41 and concave 42 of the magnetic movable 4 can be detected with a quarter period depending upon the level difference in the signal h.

More specifically, the level change in the signal h is described in detail in the following.

(1) With Signals e, f Both Low in level L

The first, fifth and sixth Trs 51, 58, 59 are non-conductive whereas the second, third and fourth Trs 52, 53, 54 are conductive. Due to this, the signal h takes the level of grounding GND. In FIG. 16, the signal-h level in this case is shown at "1".

(2) With Signal e High in Level H and Signal f Low in Level L

The first, second, fourth and fifth Trs 51, 52, 54, 58 are conductive while the third and sixth Trs 53, 59 are non-conductive. This provides:

signal $h=VCC \times \{(R2 \times R3)/(R2+R3)\}/[R1+\{(R2 \times R3)/(R2+R3)\}]$.

In FIG. 16, the signal-h level in this case is shown at "2".

(3) With Signals e, f Both High in Level H

The first and fifth Trs 51, 58 are conductive whereas the other transistors are non-conductive. This provides:

signal $h=VCC \times \{R2/(R1+R2)\}$.

In FIG. 16, the signal-h level in this case is shown at "3".

(4) With Signal e Low in Level L and Signal f High in Level H

The sixth and third Trs 59, 53 are conductive whereas the other transistors are non-conductive, so that the signal h takes the level of power voltage VCC. In FIG. 16, the signal-h level in this case is shown at "4".

If it is now assumed that VCC=3 [V], R1=2 [KΩ], R2=4 [KΩ], R3=⅔ [KΩ] and each Tr's Vsat=0, then the following results:

level "1" of the signal h=0 [V]
level "2" of the signal h=1 [V]
level "3" of the signal h=2 [V]
level "4" of the signal h=3 [V].

As shown in the figure, the output signal h of the sensor unit 50 changes the greatest at the full edge of the convex 41 of the magnetic movable 4.

The third comparator circuit 44 has a comparison level CL set at between the signal-h levels "2" and "3". For a signal h having levels "3" and "4", the third comparator circuit 44 has an output signal i that is low in level. For a signal h having levels "1" and "2", the signal i is high in level. Meanwhile, in the reverse-rotation detecting circuit 60, when the input signal h changes in level as "1", "2", "3", and "4" in this order, the logic circuit 62 makes a processing such that the output signal j is maintained low in level. Accordingly, by the fact the signal j is low in level, rotation can be detected forward as to the magnetic movable 4 and hence the object-being-detected.

Although there is no showing of the waveforms of the signals e, f, h, i, j in a reverse rotation of the magnetic movable 4, the signal e occurs with a delay in a predetermined amount of phase relative to the signal f upon a reverse rotation of the magnetic movable 4 as noted in the first embodiment. The signal waveforms in this case can be shown by inverting all the arrows in FIG. 14. Namely, in the case of reverse rotation of the magnetic movable 4, the signal h changes in level as "4", "3", "2" and "1" in the order.

The third comparator circuit 44 has a comparison level CL set at between the signal-h levels "2" and "3". For a signal h having levels "3" and "4", the third comparator circuit 44 has an output signal i that is low in level similarly to the case of forward rotation. For a signal h having levels "1" and "2", the signal i is high in level. Meanwhile, in the reverse-rotation detecting circuit 60, when the input signal h changes in level as "4", "3", "2" and "1" in this order, the logic circuit 62 makes a processing such that the output signal j is maintained high in level. Accordingly, by the fact the signal j becomes high in level, rotation can be detected reverse as to the magnetic movable 4 and hence the object-being-detected.

In the fifth embodiment, the order of signal-h level change is different from that of the first embodiment. However, similarly to the first embodiment shown in FIG. 8, even in the case the magnetic movable 4 is inverted in rotation at any of time points (a), (b), (c) and (d), the signal j immediately changes in level from low to high at a time that any of the signals e, f first changed in level after that time. According to the magnetic sensor in the fifth embodiment of the invention, reverse rotation of a magnetic movable can be detected swiftly by a simple circuit structure and correctly without erroneous detections. Thus, reverse rotation of the magnetic movable 4 can be detected swiftly and correctly without erroneous detections.

What is claimed is:

1. A magnetic sensor comprising:
a magnetic movable member that moves in response to a movement of an object-being-detected;

a sensor section provided opposite to the magnetic movable member through a gap and for detecting a change of magnetic field in the gap due to a movement of the magnetic movable member;

a conversion circuit that converts the change in the magnetic field sensed by the sensor section into a plurality of electric signals, a relationship among the phases of the electric signals changing depending on whether a moving direction of the magnetic movable member is a first moving direction or a second moving direction;

a signal forming circuit that forms a signal having at least four different levels based on the plurality of electric signals obtained through conversion by the conversion circuit, wherein a cycle in which the levels change in a predetermined order is repeated while the magnetic movable member moves in the first moving direction and a cycle in which the levels change in an order other than the predetermined order is repeated while the magnetic movable member moves in the second moving direction; and a reversal sensing circuit to which the signal formed by the signal forming section is inputted and whose output state changes in a case where, when the magnetic movable member moves in one of the first moving direction and the second moving direction, a level derived from each level among the plurality of levels in an arbitrary cycle out of the cycles differs from a level derived from said each level in a cycle immediately prior to the arbitrary cycle, wherein, based on a change in the output state of the reversal sensing circuit, it is detected that the moving direction of the magnetic movable member has changed from one of the first moving direction and the second moving direction to the other of the first moving direction and the second moving direction.

2. A magnetic sensor according to claim 1, wherein the magnetic movable member has a plurality of continuing convexes and concaves, the sensor section having a plurality of magnetic detecting elements arranged parallel in a moving direction of the magnetic movable member and having a resistance changing depending upon a change of magnetic field due to an opposed relation to the convex and concave of the magnetic movable member, the conversion circuit having first and second bridge circuits having the plurality of magnetic detecting elements on different sides thereof and first and second comparator circuits that generate first and second rectangular-wave signals depending upon outputs of the respective bridge circuits.

3. A magnetic sensor according to claim 1, wherein the magnetic movable member has a plurality of convexes and concaves opposite to the sensor section through a gap, the signal assuming maximum in level at a predetermined opposite position of the magnetic movable member and the sensor section.

4. A magnetic sensor according to claim 3, wherein the predetermined opposite position lies substantially at a fall edge of the convex with respect to a moving direction of the magnetic movable member.

5. A magnetic sensor according to claim 3, wherein the predetermined opposite position lies substantially at a center of the convex with respect to a moving direction of the magnetic movable member.

6. A magnetic sensor according to claim 3, wherein the predetermined opposite position lies substantially at a center of the concave with respect to a moving direction of the magnetic movable member.

7. A magnetic sensor according to claim 3, wherein the predetermined opposite position lies substantially at a rise edge of the convex with respect to a moving direction of the magnetic movable member.

* * * * *